United States Patent
Tanonaka

(10) Patent No.: US 6,487,223 B1
(45) Date of Patent: Nov. 26, 2002

(54) SDH TRANSMISSION APPARATUS WITH FLEXIBLE SYSTEM CONFIGURATION

(75) Inventor: Kouji Tanonaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/160,691

(22) Filed: Sep. 25, 1998

(30) Foreign Application Priority Data

Mar. 18, 1998 (JP) .......................................... 10-068484

(51) Int. Cl.[7] .................................................. H04J 3/22
(52) U.S. Cl. ...................................... 370/539; 370/541
(58) Field of Search ................................. 370/401, 403, 370/405, 463, 465, 466, 468, 534, 541, 545; 359/117; 707/104.1

(56) References Cited

U.S. PATENT DOCUMENTS

| | | | | |
|---|---|---|---|---|
| 5,416,768 A | * | 5/1995 | Jahromi ........................ | 370/403 |
| 5,742,605 A | * | 4/1998 | Norman, Jr. .................. | 370/405 |
| 5,757,793 A | * | 5/1998 | Read et al. ................... | 370/545 |
| 5,786,912 A | * | 7/1998 | Kartalopoulos ............... | 359/117 |
| 5,809,501 A | * | 9/1998 | Noven .......................... | 707/104.1 |
| 6,134,238 A | * | 10/2000 | Noh ............................. | 370/468 |

* cited by examiner

Primary Examiner—Salvatore Cangialosi
(74) Attorney, Agent, or Firm—Katten Muchin Zavis Rosenman

(57) ABSTRACT

An SDH transmission unit which processes various classes of digital bitstreams regardless of their levels of the SDH multiplexing hierarchy, harmonizing the signal formats handled in its integral cross-connect facilities. High-order group transmission units are installed in their dedicated high-order group slots on a mounting rack, and through the wiring on a backplane, they are connected to high-order group ports of a cross-connect unit installed in the same rack. Similarly, low-order group transmission units are installed in dedicated low-order group slots on the mounting rack, and connected to low-order group ports of the cross-connect unit through the backplane. Both high-order and low-order group transmission units are designed to send and receive multiplexed signals at a predetermined level of the SDH multiplexing hierarchy. Because of this harmonized signal format, the high-order and low-order group transmission units seamlessly interface with the cross-connect unit, no matter what level of multiplexed signals they process in their internal activities.

15 Claims, 33 Drawing Sheets

SDH TRANSMISSION APPARATUS WITH FLEXIBLE SYSTEM CONFIGURATION

BACKGROUND OF THE INVENTION

1. Field of the Invention

The present invention relates to a transmission apparatus based on the Synchronous Digital Hierarchy (SDH), and more particularly to an SDH transmission apparatus having a highly flexible system configuration.

2. Description of the Related Art

Recent advancement in international standardization of SDH transmission systems have accelerated the development of many types of standard multiplex transmission units, allowing a variety of digital transmission systems to be integrated in different ways. To meet the various needs, however, it is desired to develop such an SDH transmission apparatus that is equipped with a versatile mechanism to cross-connect low-order and high-order group transmission units, while allowing various classes of digital bitstreams to be handled with simple internal structure, regardless of their levels in the SDH multiplexing hierarchy.

Here, a few examples of conventional transmission apparatus are presented in FIGS. 30 to 32. FIG. 30 shows a transmission apparatus which has a cross-connect unit 101 to interconnect high-level group units including two STM-1 units 102 and 103, and low-order group units including a plurality of 2M units 104. The STM-1 units 102 and 103 are SDH transmission apparatus serving as multiplex/demultiplex facilities, which convert the signal frames from the Synchronous Transfer Module Level 1 (STM1) format to the Administrative Unit-4 (AU-4) format, and vice versa. They provide the cross-connect unit 101 with multiplexed signals having the AU-4 frame format. The 2M units 104 interface with lower speed services by acting as multiplex/demultiplex facilities which convert C-12 frames to Tributary Unit Group-2 (TUG-2) frames, and vice versa. Here, the term "C-12" denotes a container which accommodates 2.048 Mb/s Plesiochronous Digital Hierarchy (PDH) signals, where the name "2M unit" implies this specific bitrate to be handled. The 2M units 104 provides the cross-connect unit 101 with multiplexed signals having the TUG-2 frame format. The cross-connect unit 101 is a switching element that supports the consolidation, segregation, and grooming of paths running across a plurality of transmission lines. It also functions as a frame format converter that enables TUG-2 multiplexed signals sent from the plurality of 2M units 104 to be reformed into AU-4 multiplexed signals.

FIG. 31 is a block diagram of another type of a transmission apparatus, which employs a cross-connect unit 111 to interconnect high-level group units including two STM-1 units 112 and 113, and low-order group units including a plurality of 34M units 114. The STM-1 units 112 and 113 serve as multiplex/demultiplex facilities which convert STM-1 frames to AU-4 frames, and vice versa, thus providing the cross-connect unit 111 with AU-4 multiplexed signals. The 34M units 114 interface with lower speed services by acting as multiplex/demultiplex facilities to convert C-3 frames to TUG-3 frames, and vice versa. Here, the term "C-3" represents a container which accommodates 34.368 Mb/s PDH signals, as the name "34M unit" implies. The 34M units 114 supply the cross-connect unit 111 with TUG-3 multiplexed signals. Besides providing path switching capabilities, the cross-connect unit 111 serves as a frame format converter that allows TUG-3 multiplexed signals sent from the plurality of 34M units 114 to be reformed into AU-4 multiplexed signals.

FIG. 32 illustrates still another example of a transmission apparatus, which has a cross-connect unit 121 to interconnect high-level group units including two STM-4 units 122 and 123, and low-order group units including a plurality of 140M/STM-1 units 124. The STM-4 units 122 and 123 are multiplex/demultiplex facilities that convert STM-4 frames to AU-4 frames, and vice versa, thus providing the cross-connect unit 121 with AU-4 multiplexed signals. The 140M/STM-1 units 124 serve as multiplex/demultiplex facilities to convert C-4 or STM-1 frames to AU-4 frames, and vice versa. A C-4 frame is a container which accommodates 138.264 Mb/s PDH signals. The 140M/STM-1 units 114 supply the cross-connect unit 121 with AU-4 multiplexed signals. Note here that the cross-connect unit 121 does not have a function to convert signal formats, since its input and output signals have a unified format, AU-4.

As understood from FIGS. 30 to 32, conventional SDH transmission apparatus have different internal configurations depending on the hierarchical levels of multiplexed signals that they should deal with. Particularly, it is a problem that their integral cross-connect units have to be replaced with other ones, in order to introduce a different type of low-order group units into the system. Recall the aforementioned transmission apparatus of FIG. 30, for example. The cross-connect unit 101 used in this transmission apparatus is designed to interface with a particular type of low-order group units, i.e., 2M units. For this reason, it is not possible to install 34M units in place of the present 2M units 104. To do so, the cross-connect unit 101 must be changed to another type, such as a cross-connect unit 111 shown in FIG. 31. Similarly, since the cross-connect unit 111 shown in FIG. 31 cannot work with 140M/STM-1 units 124 in FIG. 32, one should replace it with another type of cross-connect unit, such as a cross-connect unit 121 shown in FIG. 32, in order to use 140M/STM-1 units.

The conventional transmission apparatus have still another problem as will be described below. FIG. 33 shows a system in which network devices 131 to 133 each consolidate 2.048 Mb/s or 34.368 Mb/s PDH signals into a single STM-1 bitstream and a network device 134 multiplexes four STM-1 bitstreams into a single STM-4 bitstream. Here, the network devices 131 to 133 each correspond to the transmission apparatus of FIG. 30 or FIG. 31, while the network device 134 corresponds to the transmission apparatus of FIG. 32. These four network devices 131 to 134 are under the control of a management unit 135 which monitors and supervises them through the connection paths indicated by the broken lines. As FIG. 33 shows, this conventional system is not simple since it requires two processing stages only to convert 2.048 Mb/s or 34.368 Mb/s PDH signals into a single STM-4 bitstream. As such, the increase in the number of network elements will make the management tasks more complex and result in a higher system cost that the customer should pay for.

SUMMARY OF THE INVENTION

Taking the above into consideration, an object of the present invention is to provide an SDH transmission apparatus with a simplified internal configuration, employing a versatile cross-connect unit that can deal with various classes of digital bitstreams regardless of their levels in the multiplexing hierarchy.

To accomplish the above object, according to the present invention, there is provided an SDH transmission apparatus which multiplexes transmission signals according to a multiplexing hierarchy. This apparatus comprises the following elements:

a mounting rack having a plurality of module slots and a backplane providing electrical interconnection among functional modules installed in the plurality of module slots;

a cross-connect unit, installed in dedicated cross-connect unit slots on the mounting rack, which comprises high-order group ports and low-order group ports;

at least one high-order group transmission unit, installed in dedicated high-order group slots on the mounting rack, which sends and receives multiplexed signals at a predetermined level of the multiplexing hierarchy to/from the high-order group ports of the cross-connect unit; and a plurality of low-order group transmission units, installed in dedicated low-order group slots on the mounting rack, which sends and receives the multiplexed signals at the predetermined level of the multiplexing hierarchy to/from the low-order group ports of the cross-connect unit.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

A plurality of embodiments of the present invention will be described below with reference to the accompanying drawings.

Figure 1A:
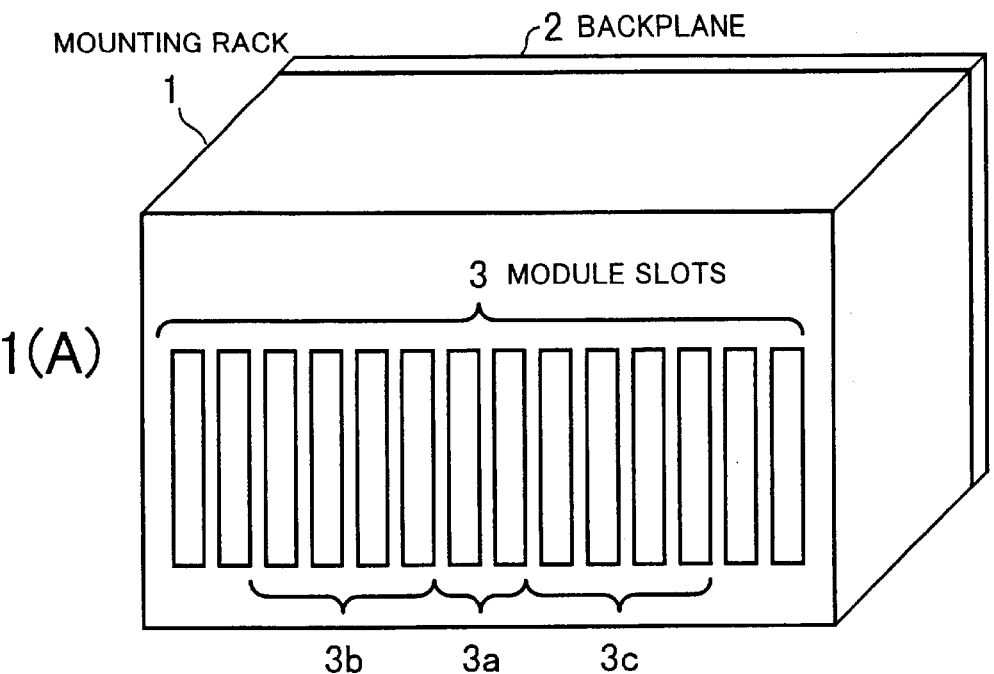
FIG. 1(A) is a diagram which shows a simplified external view of a transmission apparatus assembled in a mounting rack.
Figure 1B:
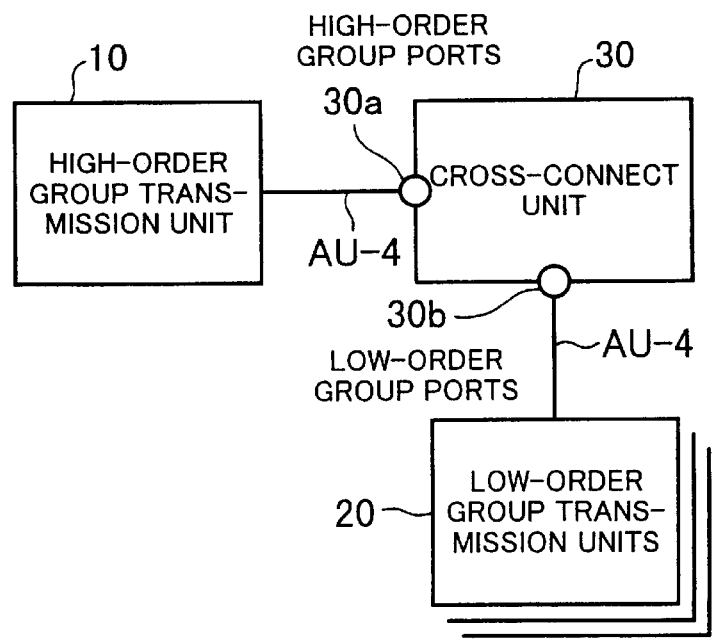
FIG. 1(B) is a block diagram which briefly shows the internal configuration of a transmission apparatus.

Referring first to FIGS. 1(A) and 1(B), the following section will explain the concept of the embodiments of the present invention. FIGS. 1(A) and 1(B) show the appearance and internal structure of an SDH transmission apparatus of the present invention. This SDH transmission apparatus multiplexes transmission signals according to the SDH multiplexing hierarchy, which comprises the following elements:

a mounting rack 1 having a plurality of module slots 3 and a backplane 2 providing electrical interconnection among functional modules installed in the plurality of module slots 3;

a cross-connect unit 30, installed in dedicated cross-connect unit slots 3a on the mounting rack 1, which comprises high-order group ports 30*a* and low-order group ports 30*b;* at least one high-order group transmission unit 10, installed in dedicated high-order group slots 3*b* on the mounting rack 1, which sends and receives multiplexed signals at a predetermined level of the multiplexing hierarchy to/from the high-order group ports 30*a* of the cross-connect unit 30; and a plurality of low-order group transmission units 20, installed in dedicated low-order group slots 3*c* on the mounting rack 1, which sends and receives the multiplexed signals at the predetermined level of the multiplexing hierarchy to/from the low-order group ports 30*b* of the cross-connect unit 30.

As described above, the mounting rack 1 has a plurality of module slots 3 and a backplane 2 in order to accommodate a plurality of functional modules in their respective slot locations that have previously been assigned to them. Functional modules are usually provided in the form of printed circuit boards each having a connector(s) on their backplane-side edge. When installed in the slots, the functional modules are coupled to the backplane 2 through the mating connectors, thus obtaining module-to-module electrical connections through wiring patterns that are formed on the backplane 2 interconnect the slots in an appropriate manner.

As an essential functional module, the cross-connect unit 30 is installed in its dedicated slots 3*a* on the mounting rack 1. It has high-order group ports 30*a* and low-order group ports 30*b* to interface with transmission units. As optional functional modules, at least one high-order group transmission unit 10 is inserted into its dedicated slots 3*b* on the mounting rack 1. The aforementioned wiring on the backplane 2 allows multiplexed input and output signals to be supplied from this high-order group transmission unit 10 to the high-order group port 30*a* of the cross-connect unit 30 being installed. These multiplexed signals conform to the AU-4 administrative unit format, for example, which is defined as one level of the SDH multiplexing hierarchy. Also as optional functional modules, a plurality of low-order group transmission units 20 are installed into the low-order group slots 3*c* and thus connected to the low-order group ports 30*b* of the cross-connect unit 30 through the wiring on the backplane 2. It should be noted that the multiplexed signals that appear at the low-order group ports 30*b* are also compatible with the AU-4 administrative unit format, as are the signals supplied to/from the high-order group transmission unit 10 through the high-order group ports 30*a*.

As such, the high-level group transmission unit 10 and the low-order group transmission units 20 handle different signal types in terms of the multiplexing hierarchy of SDH, but they are designed to interface with the cross-connect unit 30 at a common, predetermined level (e.g., AU-4) of the hierarchy. Because the digital bitstreams received from the high-order and low-order group ports 30*a* and 30*b* have a unified frame structure, the cross-connect unit 30 can concentrate on the tasks of path consolidation, segregation, and grooming, without converting the signal formats.

The above structural arrangement of the present invention brings an advantage that a desired transmission apparatus can easily be built by choosing low-order and/or high-order group transmission units designed for the required mapping levels and simply installing them into the predetermined module slots 3 of the mounting rack 1. In other words, the present invention permits the same cross-connect unit 30 to be used to switch various classes of digital bitstreams regardless of their levels in the SDH multiplexing hierarchy, thus simplifying the structure of the SDH transmission apparatus.

Now, the following sections will present the details of the embodiments outlined above.

Figure 2:
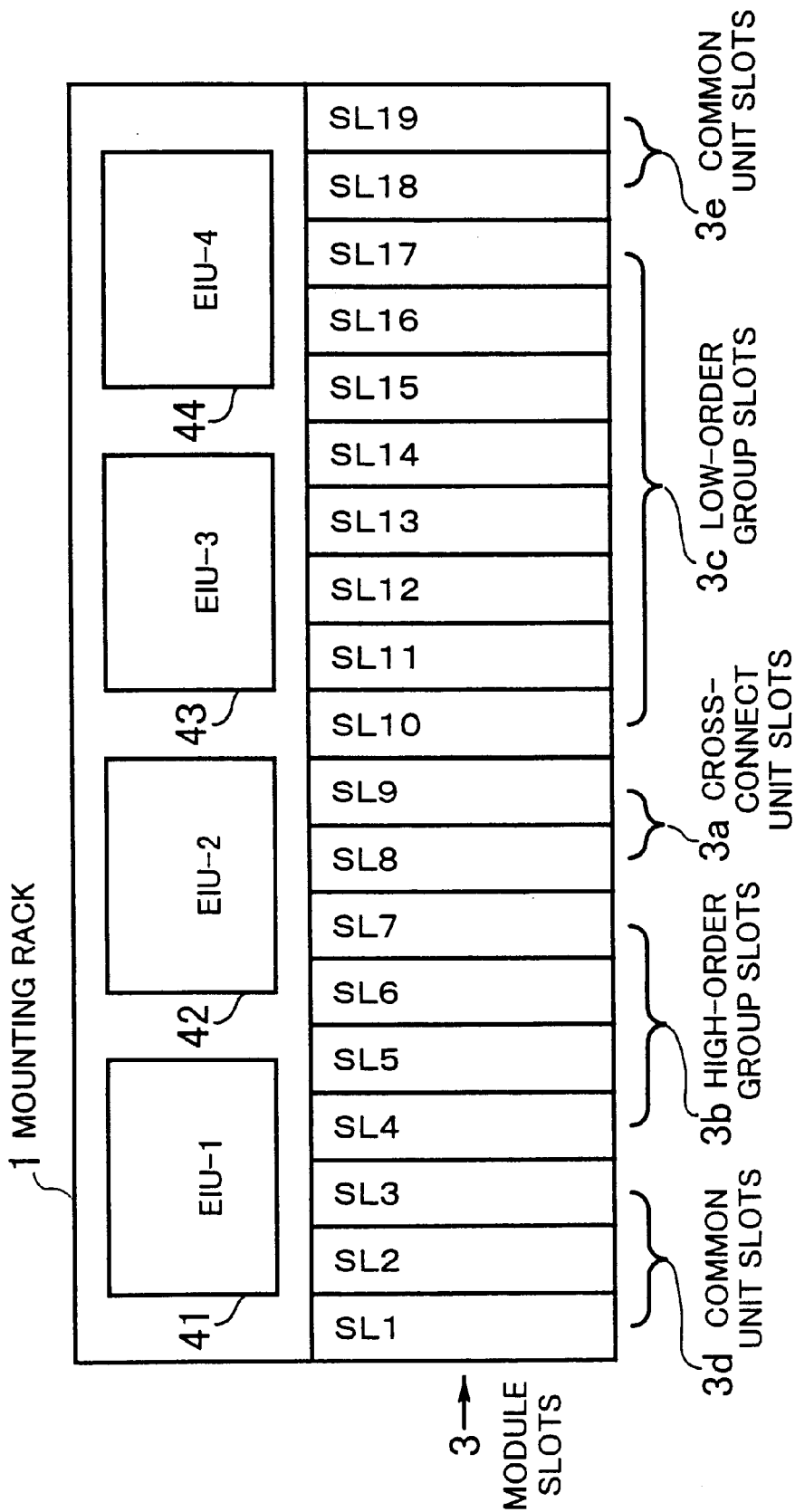
FIG. 2 is a diagram which shows a front view of a mounting rack.

FIG. 2 is a front view of the mounting rack 1, showing the arrangement of functional modules to be installed. More specifically, the module slots 3 comprises nineteen slots labeled "SL1" to "SL19." The usage of these slots is predefined as follows:

three slots SL1 to SL3: common unit slots 3*d*, four slots SL4 to SL7: high-order group slots 3*b*, two slots SL8 and SL9: cross-connect unit slots 3*a*, eight slots SL10 to SL17: low-order group slots 3*c*, and two slots SL18 and SL19: common unit slots 3*e*.

Among such module slots 3, the common unit slots 3*d* and 3*e* are used to mount the following units:

a unit to collect alarm information from each functional element in the transmission apparatus, a unit to interface with a management device (not shown) which provides network monitoring and fault management functions, a unit to collect status information from each functional element in the transmission apparatus, and a unit to supply electrical power to all units in the transmission apparatus.

Furthermore, separately from the above module slots 3, four interface units 41 to 44 (EIU-1 to EIU-4) are loaded on the same mounting rack 1 to provide intermediary functions to connect the low-order group transmission units 20 with external network devices.

Figure 3:
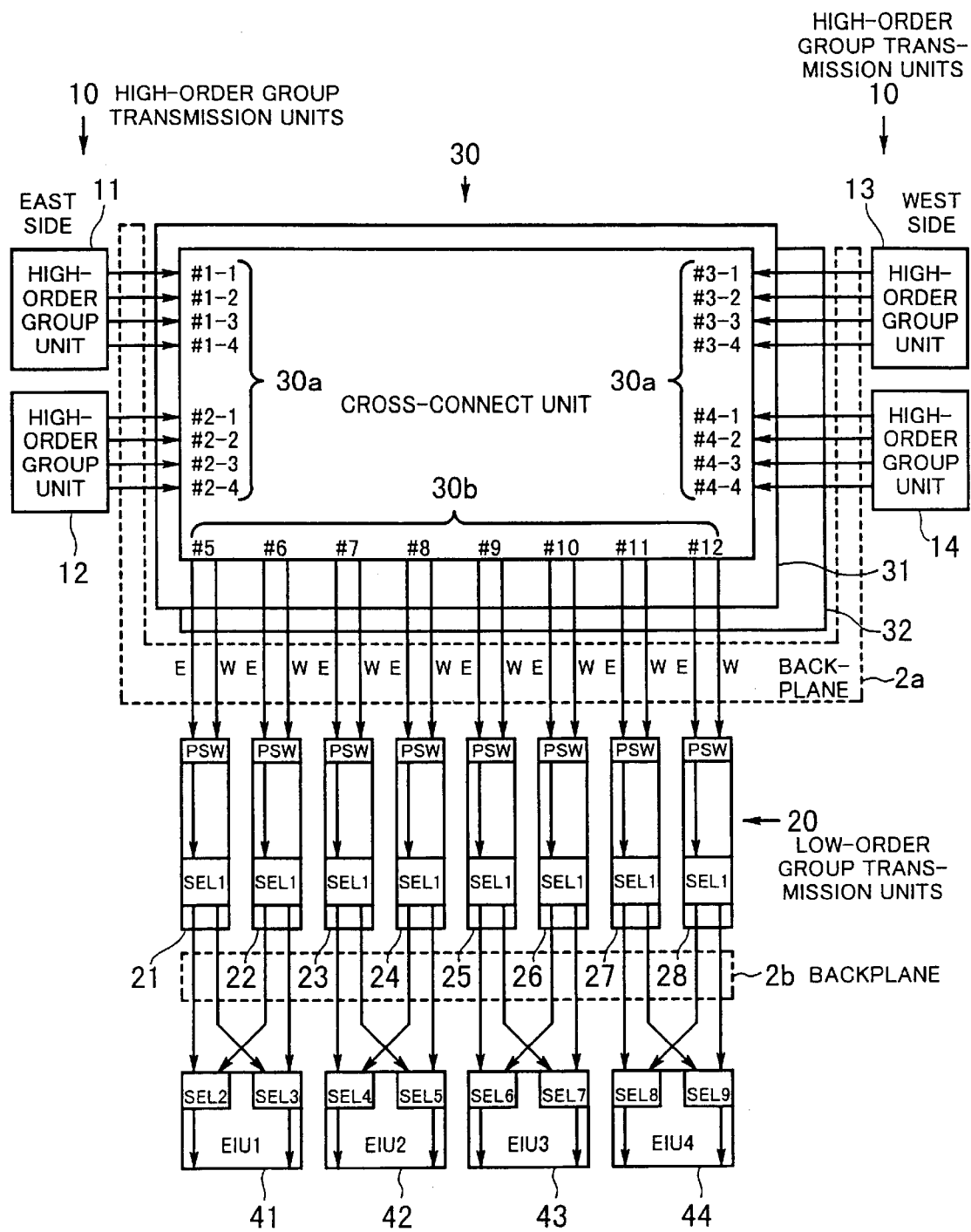
FIG. 3 is a diagram which shows an arrangement of high-level group transmission units, low-order group transmission units, a cross-connect unit, and interface units (EIU-1 to EIU-4)

FIG. 3 illustrates an arrangement of the high-level group transmission units 10, low-order group transmission units 20, cross-connect unit 30, and interface units 41 to 44 (EIU-1 to EIU-4). This shows a transmission apparatus fully equipped with as many optional units as the mounting rack 1 can accommodate. Note that, in this block diagram of FIG. 3, the backplane 2 is divided into two portions 2*a* and 2*b* to indicate two different portions of its module-to-module electrical connections, although the backplane 2 may physically be a single unit.

FIG. 3 shows that the high-order group transmission units 10 actually include four separate high-order group units 11 to 14. The selection and arrangement of the high-order group transmission units 10 are determined by the structure of a network. That is, it depends on what network topology is chosen and at which node in the network the present transmission apparatus is deployed. As will be clarified in later sections, the network can take a specific topology, such as point-to-point, ring, and linear configurations. The high-order group units 11 to 14 are installed in the module slots SL4 to SL7 (FIG. 2), respectively. Those high-order group units 11 to 14 may have different internal structures depending on what level of multiplexed signals they handle. The detailed discussion on this issue will be made in later sections with reference to FIGS. 11 to 16.

The low-order group transmission units 20, on the other hand, include eight separate units 21 to 28, whose selection and arrangement depend on the aforementioned network structure and the redundancy features implemented in the system. The low-order group units 21 to 28, installed in the module slots SL10 to SL17 (FIG. 2), may have different internal structures according to what level of multiplexed signals they process. The detailed discussion on this issue will be made in later sections, with reference to FIGS. 5 to 12 and 15.

To improve the availability of transmission services, the cross-connect unit 30 may be configured to have a high degree of fault tolerance, employing a backup cross-connect unit in addition to an active cross-connect unit. When such a dual redundant configuration is required, two cross-connect units 31 and 32 have to be inserted into the module slots SL8 and SL9 (FIG. 2), respectively. Since these active and backup cross-connect units 31 and 32 are functionally identical with each other, the following sections will collectively call the two units by the name "cross-connect unit 30."

The cross-connect unit 30 has high-order group ports 30a and low-order group ports 30b. The high-order group ports 30a are divided into two groups: east side ports labeled #1-1 to #1-4 and #2-1 to #2-4, and west side ports labeled #3-1 to #3-4 and #4-1 to #4-4. On the other hand, the low-order group ports 30b consists of eight ports labeled #5 to #12.

As will be discussed in later sections, there are several types of low-order group units, including 2M units, 34M units, 140M units, and STM-1 units. Those units can be used as the low-order group units 21 to 28, and no matter what kind of units are chosen, they are equally equipped with a path switch PSW and an output selector SEL1. When the present transmission apparatus is deployed as a node in a dual ring network, the path switch PSW selects one of two transmission signals that have been transmitted to both directions of the ring and arrived at the east and west side ports. The output selector SEL1 is a demultiplexer that determines the destination of the output of each low-order group transmission unit 21 to 28, depending on the presence of redundancy functions. More specifically, when the low-order group transmission units 20 are required to have a redundancy configuration, two low-order group units 21 and 22 will set their respective selectors SEL1 to send their outputs to a selector SEL2 of the interface unit 41 (EIU-1). Likewise, the next two low-order group units 23 and 24 send their outputs to a selector SEL4 of the next interface unit 42 (EIU-2) through their respective selectors SEL1, and the low-order group units 25 and 26 send their outputs to a selector SEL6 of the interface unit 43 (EIU-3) through their respective selectors SELL. Further, the low-order group units 27 and 28 send their outputs to a selector SEL8 of the interface unit 44 (EIU-4) through their respective selectors SEL1.

In contrast to the above, the low-order group transmission units 20 will be configured as follows, in the case where no redundancy is required. That is, the low-order group unit 21 supplies its output to the selector SEL2 of the interface unit 41 (EIU-1), and the low-order group unit 22 sends its output to the other selector SEL3 in the same interface unit 41 (EIU-1). In a similar manner, the low-order group units 23 and 24 supply their outputs to the selectors SEL4 and SEL5 of the interface unit 42 (EIU-2), respectively. The low-order group units 25 and 26 supply their outputs to the selectors SEL6 and SEL7 of the interface unit 43 (EIU-3), respectively. The low-order group units 27 and 28 supply their outputs to the selectors SEL8 and SEL9 of the interface unit 44 (EIU-4), respectively.

As already mentioned above, the interface unit 41 (EIU-1) contains two selectors SEL2 and SEL3; the interface unit 42 (EIU-2) contains two selectors SEL4 and SEL5; the interface unit 43 (EIU-3) contains two selectors SEL6 and SEL7; the interface unit 44 (EIU-4) contains two selectors SEL8 and SEL9. The selectors SEL2 and SEL3 are input multiplexers integrated in the interface unit 41. When a dual redundancy is implemented, one of the two low-order group units 21 and 22 serves as the active unit, while the other stays in a standby mode to back up the active unit. Therefore, the selectors SEL2 and SEL3 receive two identical signals from the low-order group units 21 and 22 and selects either one of them that originated at the active unit. Similarly, the selectors SEL4 and SEL5 receive two identical signals from the low-order group units 21 and 22 in a dual redundant configuration, and selects either one of them that originated at the active unit. Other selectors SEL6 to SEL9 cooperate with the low-order group units 25 to 28 in the same way as described above, when a redundant configuration is implemented.

Figure 4:
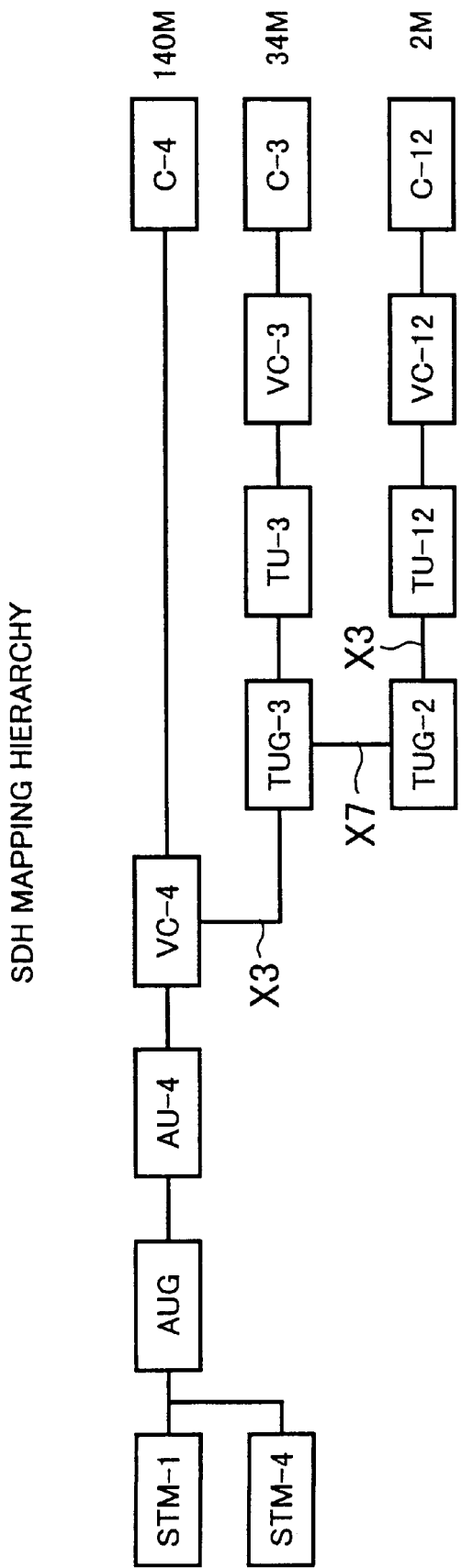
FIG. 4 is a diagram which shows the mapping hierarchy of SDH.

As a feature of the present invention, the multiplexed signals transported over the backplane 2a have a unified frame format that corresponds to a predetermined level (e.g., AU-4) in the SDH standard multiplexing hierarchy. That is, the high-order and low-order group transmission units 10 and 20 are designed to harmonize the hierarchical levels of their input and output bitstreams so as to seamlessly interface with the cross-connect unit 30, no matter what level of multiplexed signals they consolidate and/or segregate as their internal activities. With reference to FIG. 4, the next section will provide more details about the reason for this harmonization of hierarchical levels of multiplexed signals, and particularly about why AU-4 has been chosen as a preferable level.

FIG. 4 is a diagram which shows the mapping hierarchy of SDH. According to this hierarchy, 2.048 Mb/s, 34.368 Mb/s, and 138.264 Mb/s PDH signals (abbreviated as "2M," "34M," and "140M" in FIG. 4) are transported in containers named "C-12," "C-3," and "C-4," respectively. A virtual container VC-12 is formed by adding an appropriate path overhead (POH) to a C-12 container, and a tributary unit TU-12 is created by adding a TU pointer to the VC-12 virtual container. Three TU-12 tributary units are then bundled into a tributary unit group TUG-2. Furthermore, seven TUG-2 tributary unit groups form another class of a tributary unit group TUG-3. A virtual container VC-4 is composed of three TUG-3 tributary unit groups. An administrative unit AU-4 is then created by adding an AU-4 pointer to this VC-4.

In addition to the above, another kind of virtual container VC-3 is formed by adding a path overhead to the C-3 frame. This VC-3 virtual container and a TU pointer form a tributary unit TU-3, and a single TU-3 frame can be mapped to the aforementioned tributary unit group TUG-3. Further, three TUG-3 frames are bundled into a virtual container VC-4, and an administrative unit AU-4 is then formed by adding an AU-4 pointer thereto.

The virtual container VC-4 is also produced from a single C-4 container by giving a path overhead. This VC-4 virtual container becomes an administrative unit AU-4 when added an AU-4 pointer.

Furthermore, an administrative unit group AUG is created from this single AU-4 frame. Finally, a synchronous transfer module STM-N is formed by adding an appropriate section overhead (SOH) to AUG(s), where N is an integer representing a synchronous digital hierarchy level (N=1 or 4 in the preferred embodiments).

The above explanation has presented how low-bitrate services are mapped to higher-bitrate services, which processes are called "multiplexing" or "mapping." In contrast to this, the signal conversion process in the opposite direction is called "demultiplexing" or "demapping," which is accomplished by tracing back the SDH mapping hierarchy of FIG. 4, from a higher level to a lower level.

As easily understood from the above explanation, both mapping and demapping processes always pass the stage of administrative unit AU-4. Because of this advantageous position of AU-4, the SDH transmission apparatus of the present invention has chosen the AU-4 to harmonize the hierarchical levels of internal signals. The high-order and low-order group transmission units 10 and 20 seamlessly interface with the cross-connect unit 30 through this harmonized hierarchical level AU-4, no matter what level of multiplexed signals they consolidate and/or segregate as their internal activities.

Now, the following section will present various examples of the high-order and low-order group transmission units 10 and 20 which output multiplexed signals to the cross-connect unit 30 in the AU-4 format.

Figure 5:
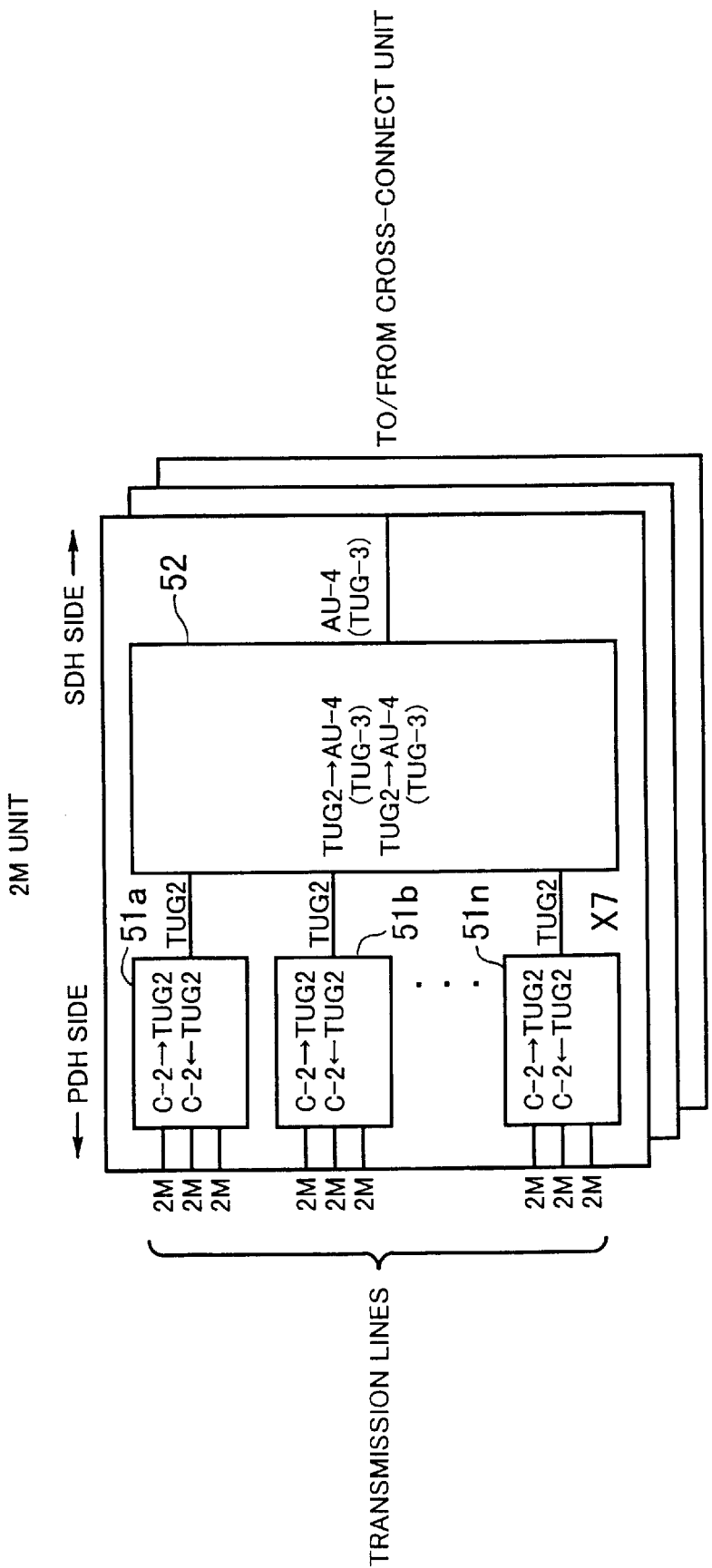
FIG. 5 is a diagram which shows the structure of a 2M unit.

FIG. 5 is a diagram which shows the structure of a 2M unit which converts 2.048 Mb/s (or "2M") PDH signals to the AU-4 frame format, and vice versa. This 2M unit is one embodiment of the low-order group transmission units 20. Although the following session will only explain a mapping process, the process flow of demapping will easily be understood by simply reversing the mapping process.

The 2M unit, comprising a plurality of first converters 51a to 51n and a second converter 52, receives 21 channels of 2.048 Mb/s PDH signals. Each first converter 51a to 51n loads three channels of 2.048 Mb/s PDH signals into their respective C-12 containers and then subjects them to a series of mapping processes, thereby producing a tributary unit group TUG-2. The second converter 52 consolidates seven instances of such TUG-2 frames into a single tributary unit group TUG-3, and after that, it creates a virtual container VC-4 to transport this TUG-3. Although the virtual container VC-4 can accommodate three TUG-3 frames, the second converter 52 uses only one third of its payload capacity to convey the TUG-3 signal created above, while leaving the remaining part just blank. This VC-4 is finally adapted into an administrative unit AU-4 by including an AU-4 pointer.

Figure 6:
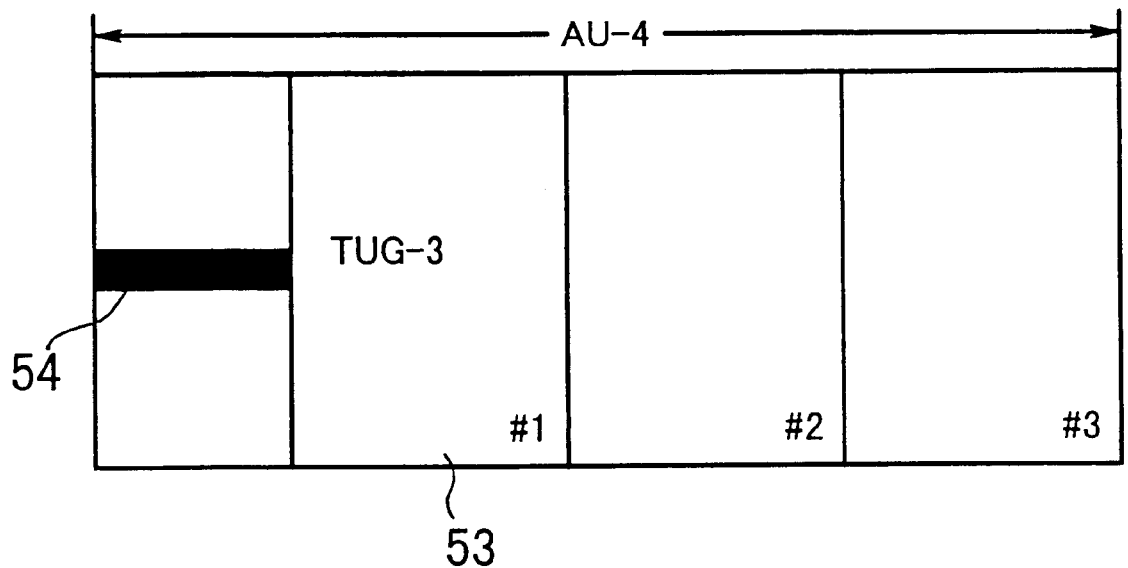
FIG. 6 is a diagram which shows the frame structure of an administrative unit AU-4 produced by a 2M unit.

FIG. 6 shows the structure of an administrative unit AU-4 produced as such by the 2M unit of FIG. 5. This AU-4 frame consists of a header portion (or overhead) and three payload portions #1 to #3. The above TUG-3 tributary unit group is loaded into the first payload portion 53 (#1), while the AU-4 pointer is put into a prescribed field 54 within the header portion. This diagram of FIG. 6, however, may not be an exact representation of the AU-4 frame format, but rather, it shows what is commonly known as the STM-1 frame format. Although the administrative unit AU-4 is just composed of a VC-4 virtual container and an AU-4 pointer, FIG. 6 uses this familiar STM-1 frame format, for convenience, to represent an AU-4 administrative unit. This notation applies also to other drawings including FIGS. 8, 10, 12, and 14.

Figure 7:
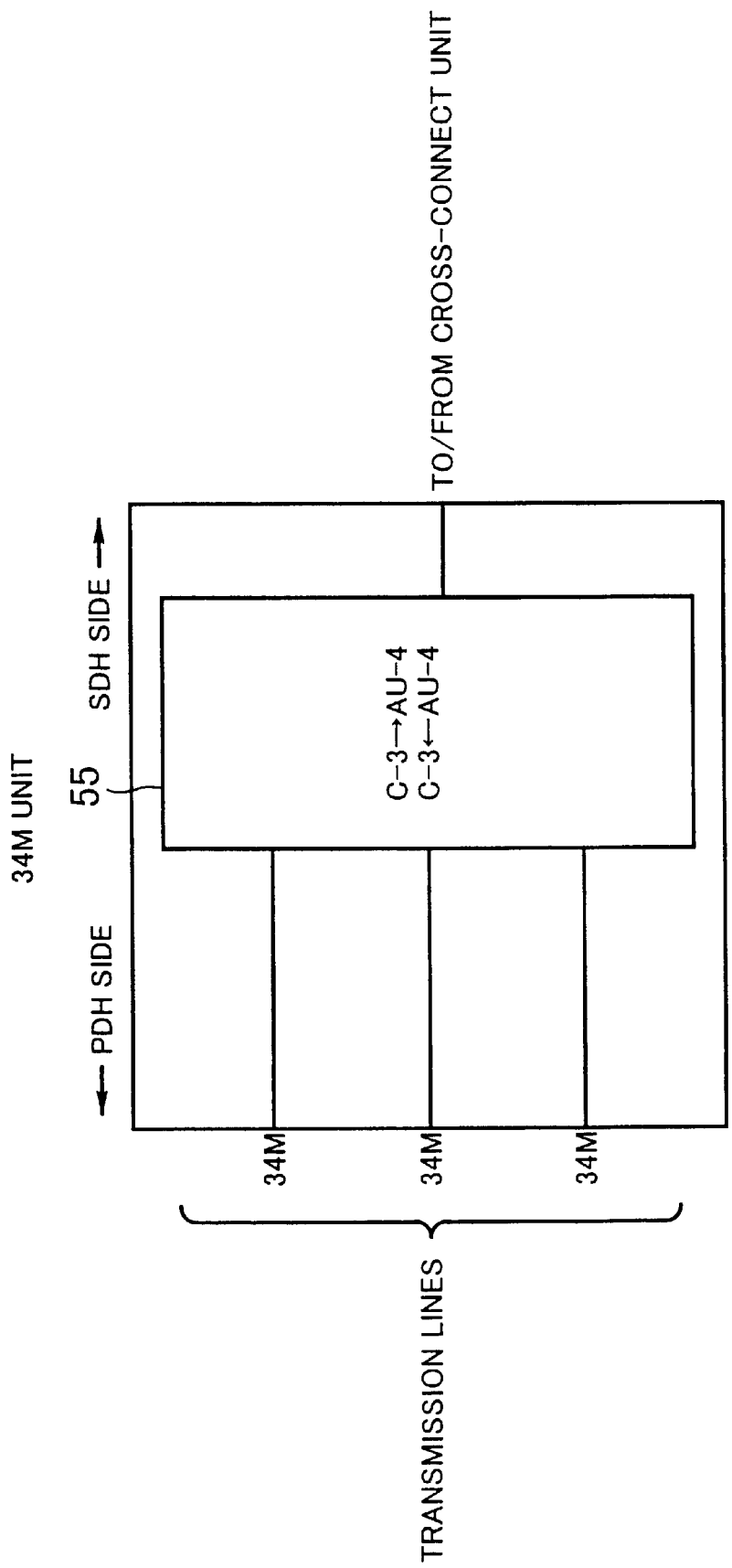
FIG. 7 is a diagram which shows the structure of a 34M unit.

FIG. 7 shows the structure of a 34M unit which converts 34.368 Mb/s (or "34M") PDH signals to an AU-4 frame, and vice versa. Similar to the aforementioned 2M units, this 34M unit falls into a family of low-order group transmission units 20. Although the following section only explains a mapping process, the process flow of demapping will easily be understood by simply reversing the mapping process.

The 34M unit comprises a converter 55, which receives three channels of 34.368 Mb/s PDH signals The converter 55 loads the received PDH signals into their respective C-3 containers and then subjects them to a series of mapping processes, thus forming three tributary unit groups TUG-3. The three TUG-3 frames are bundled into a VC-4 virtual container, and then formed into an administrative unit AU-4 having an appropriate AU-4 pointer.

Figure 8:
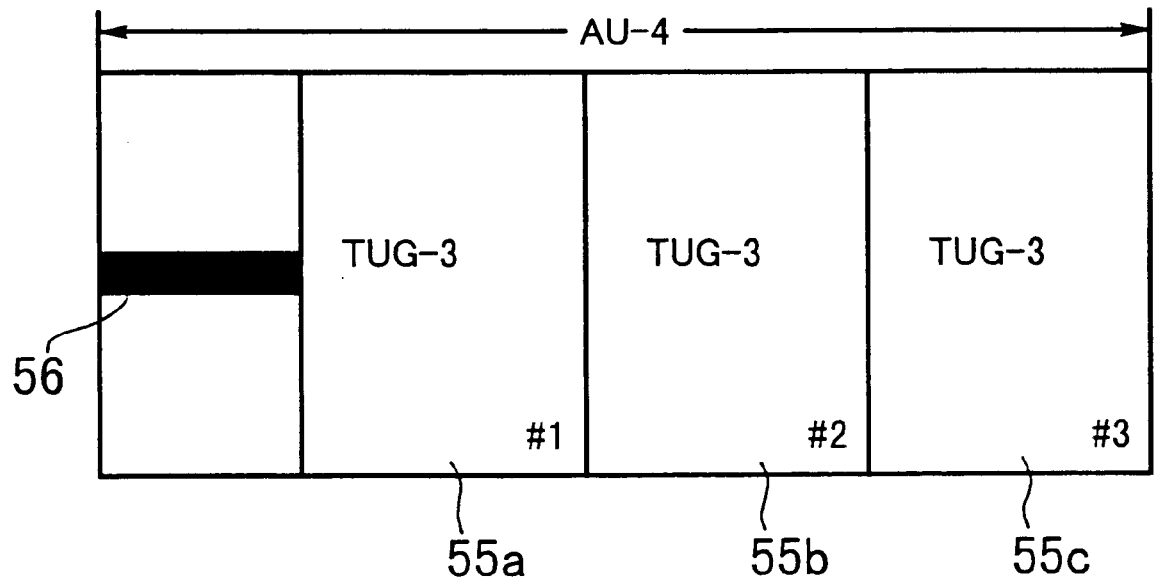
FIG. 8 is a diagram which shows the frame structure of an administrative unit AU-4 produced by a 34M unit.

FIG. 8 shows the structure of an administrative unit AU-4 produced as such by the 34M unit of FIG. 7. Here, three TUG-3 tributary unit groups are loaded to three payload portions 55a to 55c (#1 to #3), while the AU-4 pointer is put into a prescribed field 56 within the header portion.

Figure 9:
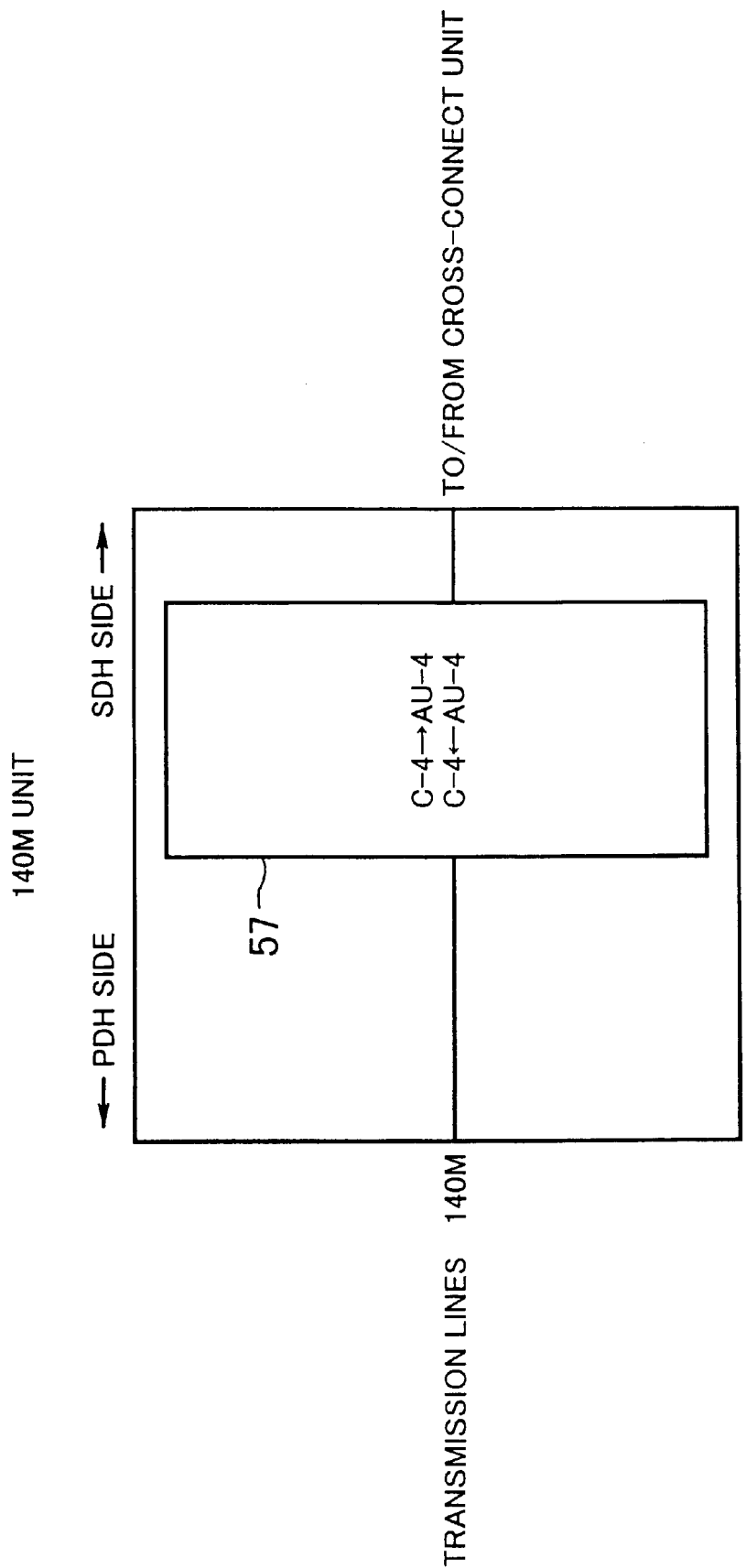
FIG. 9 is a diagram which shows the structure of a 140M unit.

FIG. 9 shows the structure of a 140M unit which converts 138.264 Mb/s (or "140M") PDH signals to the AU-4 frame format, and vice versa. Similar to the aforementioned 2M and 34M units, this 140M unit is a member of the family of low-order group transmission units 20. Although the following section only explains a mapping process, the process flow of demapping will easily be understood by simply reversing the mapping process.

The 140M unit comprises a converter 57, which receives a single channel of 138.264 Mb/s PDH signal. The converter 57 loads this PDH signal into a C-4 container and adds a path overhead, thus producing a virtual container VC-4. It then puts this VC-4 virtual container into an administrative unit AU-4 by giving an AU-4 pointer.

Figure 10:
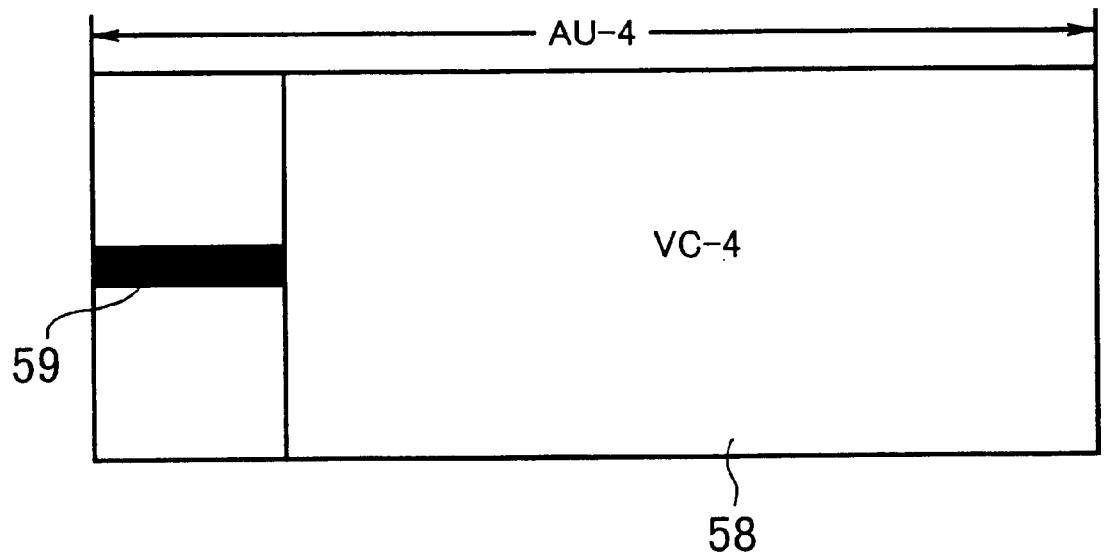
FIG. 10 is a diagram which shows the frame structure of an administrative unit AU-4 produced by a 140M unit.

FIG. 10 shows the structure of an administrative unit AU-4 produced as such by the 140M unit of FIG. 9. A VC-4 virtual container is accommodated in the payload portion 58 of this AU-4 frame, while an AU-4 pointer is put into a prescribed field 59 within the header portion.

Figure 11:
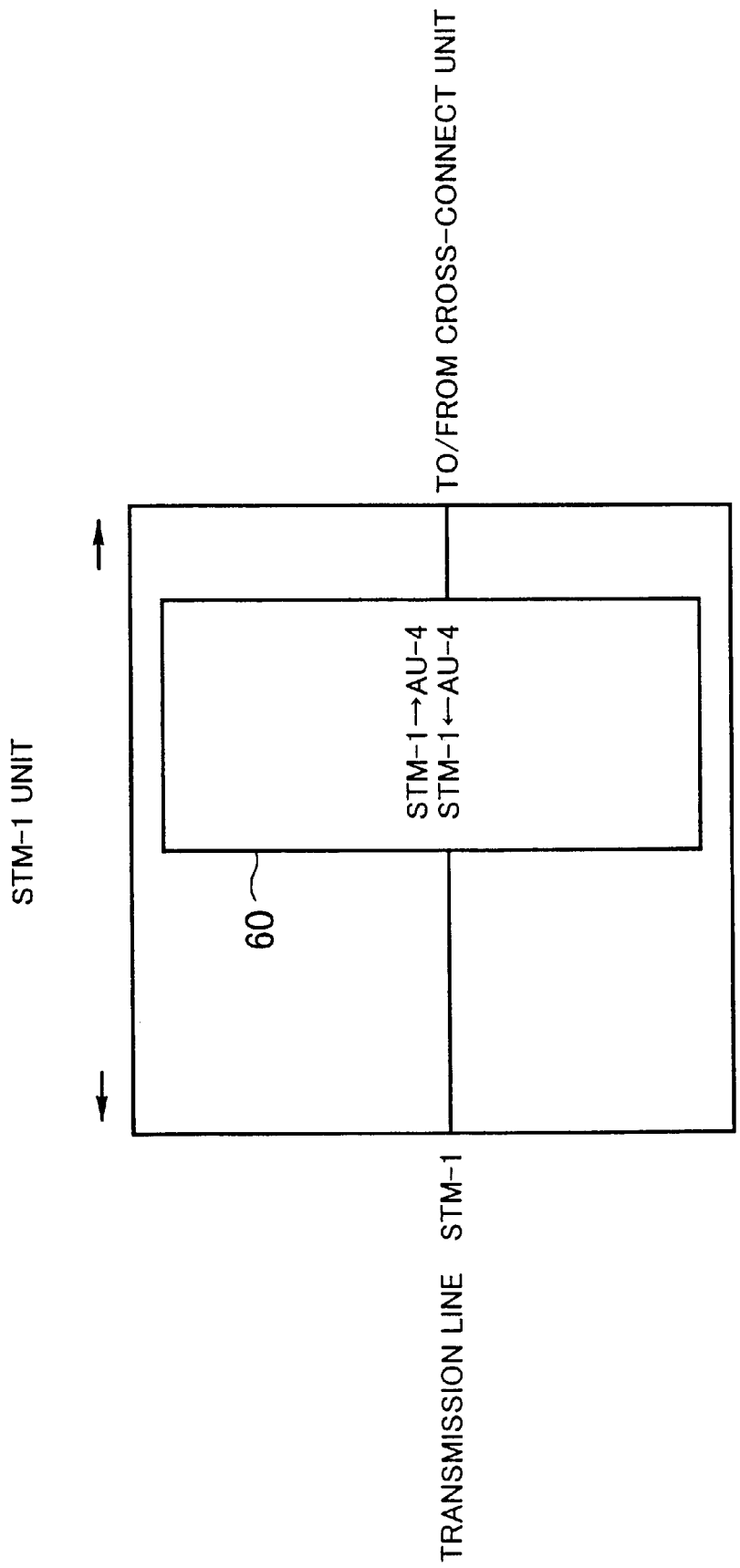
FIG. 11 is a diagram which shows the structure of an STM-1 unit.

FIG. 11 shows the structure of an STM-1 unit which converts STM-1 SDH signals to the AU-4 frame format, and vice versa. This STM-1 unit can work as a high-order group transmission unit 10 or a low-order group transmission unit 20. The STM-1 unit comprises a converter 60, which demaps the received STM-1 signals into AUG signals, and further into AU-4 administrative unit signals. The converter 60, in turn, executes a mapping process from AU-4 to STM-1 by simply reversing that demapping process.

Figure 12:
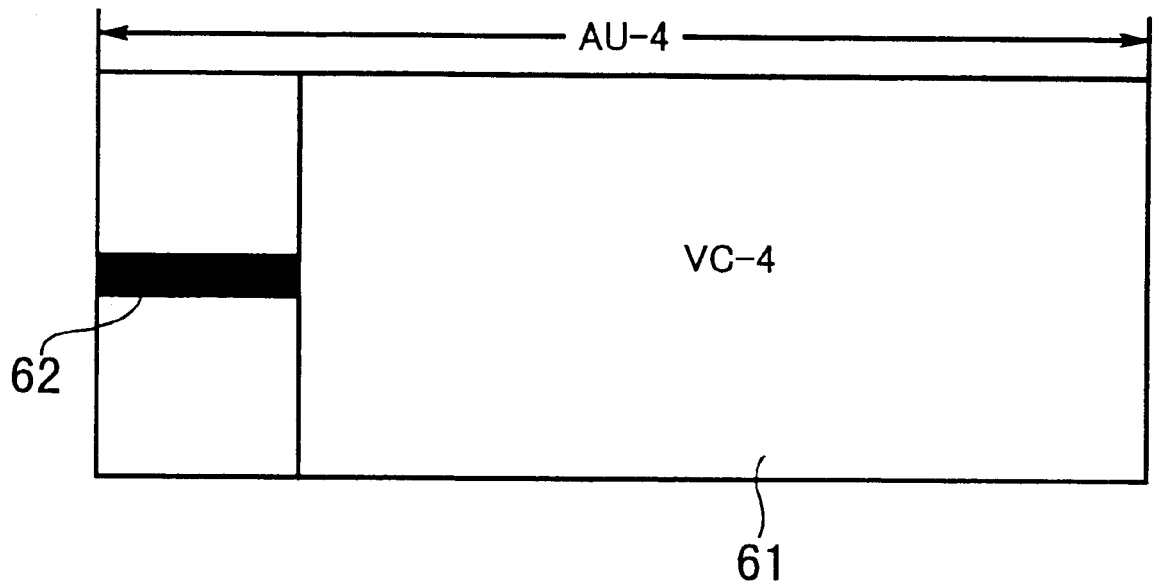
FIG. 12 is a diagram which shows the frame structure of an administrative unit AU-4 produced by an STM-1 unit.

FIG. 12 shows the structure of an administrative unit AU-4 produced as such by the STM-1 unit of FIG. 11. This AU-4 frame has a payload portion 61 to accommodate a VC-4 virtual container, as well as containing an AU-4 pointer at a prescribed field 62 within its header portion.

Figure 13:
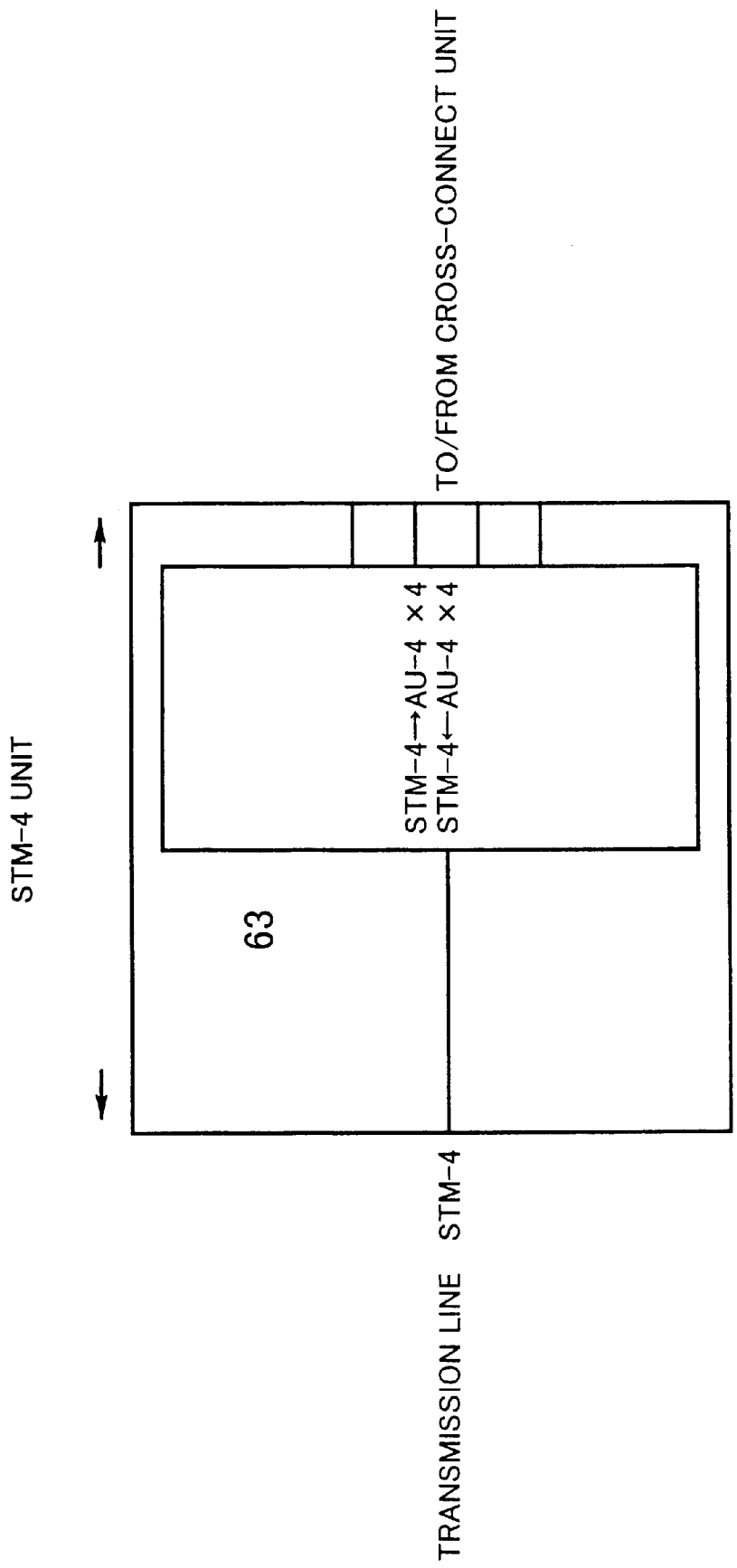
FIG. 13 is a diagram which shows the structure of an STM-4 unit.

FIG. 13 shows the structure of an STM-4 unit which converts STM-4 SDH signals to the AU-4 frame format, and vice versa. This STM-4 unit serves as a high-order group transmission unit 10. The STM-4 unit comprises a converter 63, which converts the received STM-4 signals into four AUG frames, and further into four AU-4 frames. The converter 63, in turn, executes a mapping process from AU-4 to STM-4 by simply reversing the above demapping process.

Figure 14:
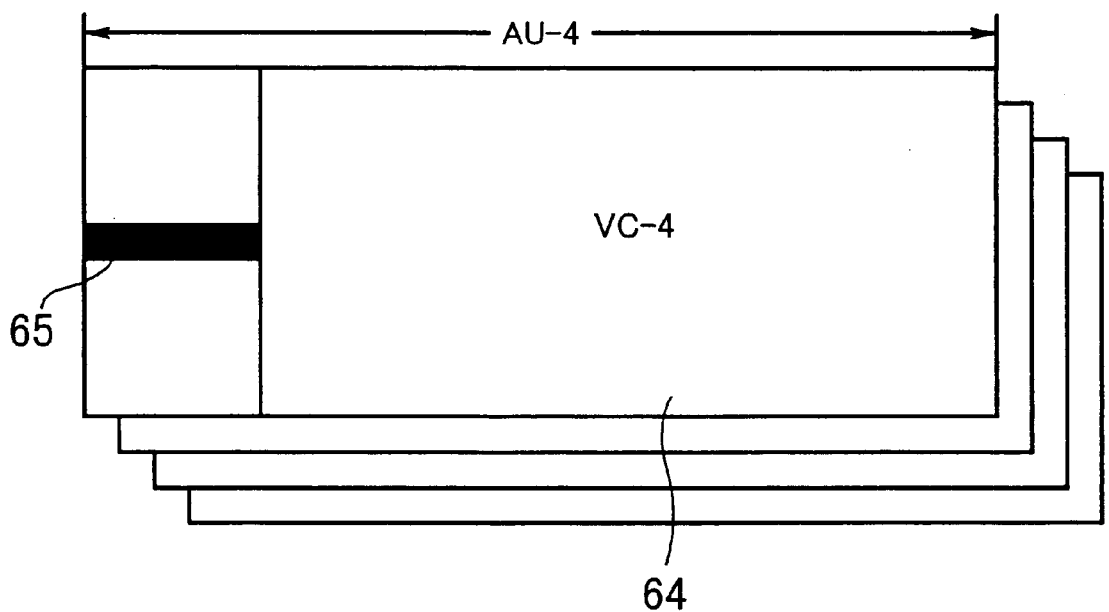
FIG. 14 is a diagram which shows the frame structure of four administrative units AU-4 produced by an STM-4 unit.

FIG. 14 shows the structure of the four administrative units AU-4 produced as such by an STM-4 unit. Each AU-4 administrative unit has a payload portion 64 to accommodate a VC-4 virtual container, as well as holding an AU-4 pointer at a prescribed field 65 within its header portion.

Figure 15:
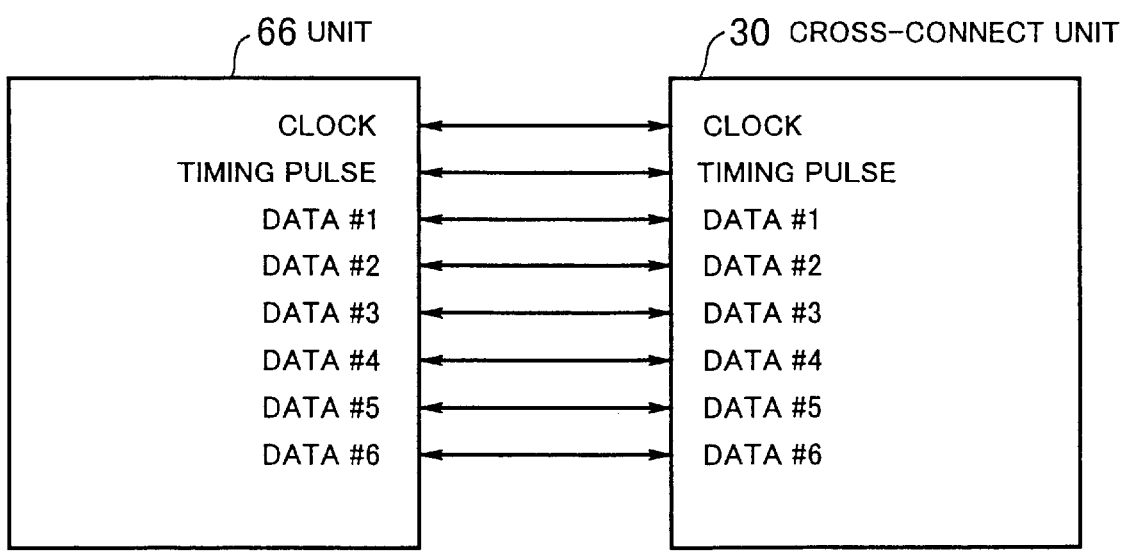
FIG. 15 is a diagram which shows the physical signal interface between a cross-connect unit and either of 2M units, 34M units, 140M units, and STM-1 units.
Figure 16:
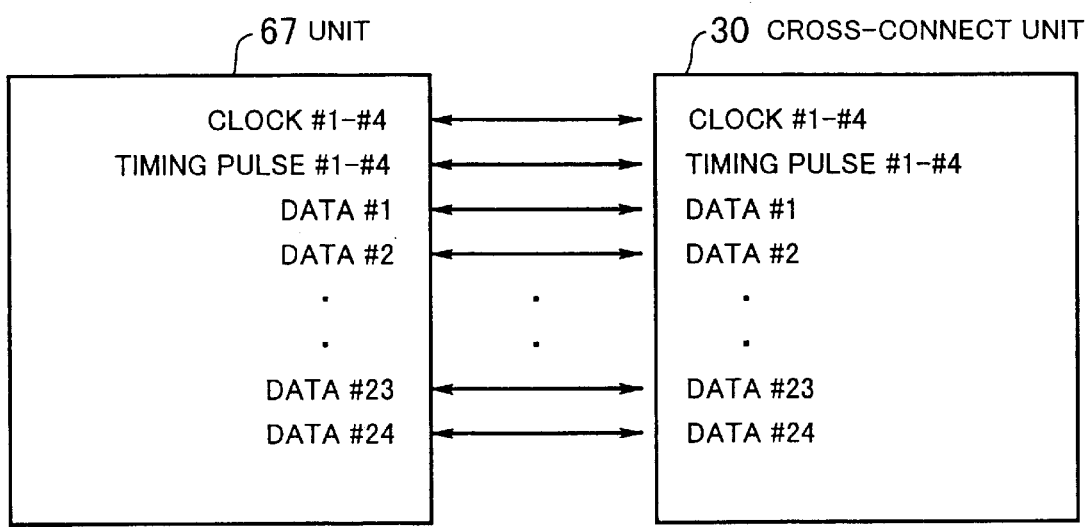
FIG. 16 is a diagram which shows a physical interface between a cross-connect unit and an STM-4 unit.

Now, the following section will describe a physical signal connection between the cross-connect unit 30 and the high-order and low-order group transmission units 10 and 20. Basically, the physical interface between those units complies with a standard series of bitrates that are expressed as (155.52/n) Mb/s, where the devisor n is an integer. With reference to FIGS. 15 and 16, the following section will discuss this interface, assuming that the devisor n is six.

FIG. 15 illustrates a physical signal connection between the cross-connect unit 30 and a unit 66, which represents a 2M unit, a 34M unit, a 140M unit, or an STM-1 unit. This interface contains the following signal connections: a clock signal having a frequency of 25.92 MHz, a timing pulse signal having a frequency of 8 kHz (or 125 $\mu$s intervals), and six data lines each having a bandwidth of 25.92 Mb/s.

FIG. 16 illustrates a physical signal connection between the cross-connect unit 30 and an STM-4 unit 67. This interface contains the following signal connections: four clock signals each having a frequency of 25.92 MHz, four timing pulse signals each having a frequency of 8 kHz (or 125 μs intervals), and twenty-four data lines each having a bandwidth of 25.92 Mb/s.

On the basis of the concept described above, the present invention allows the SDH transmission apparatus to be embodied in a variety of system configurations. This is accomplished by variously combining high-order group transmission units 10 (including STM-1 or STM-4 units) and low-order group transmission units 20 (including 2M, 34M, 140M, and STM-1 units) and then installing them into module slots 3 of the mounting rack 1, as shown in FIG. 2. The following sections will present ten specific embodiments of such SDH transmission apparatus. Common to all configurations to be explained below, it is assumed that the cross-connect unit slots 3a as part of the module slots 3 are used to mount two cross-connect units to implement a dual redundancy configuration. More specifically, an active cross-connect unit 31 is installed in the slot SL8, and a backup cross-connect unit 32 in the slot SL9, which will be collectively referred to as a "cross-connect unit 30," for simplicity. It should also be noted that the signals of interest flow from the high-order group transmission unit 10 to the low-order group transmission units 20. It is obvious, however, that there is another signal flow in the opposite direction.

Figure 17:
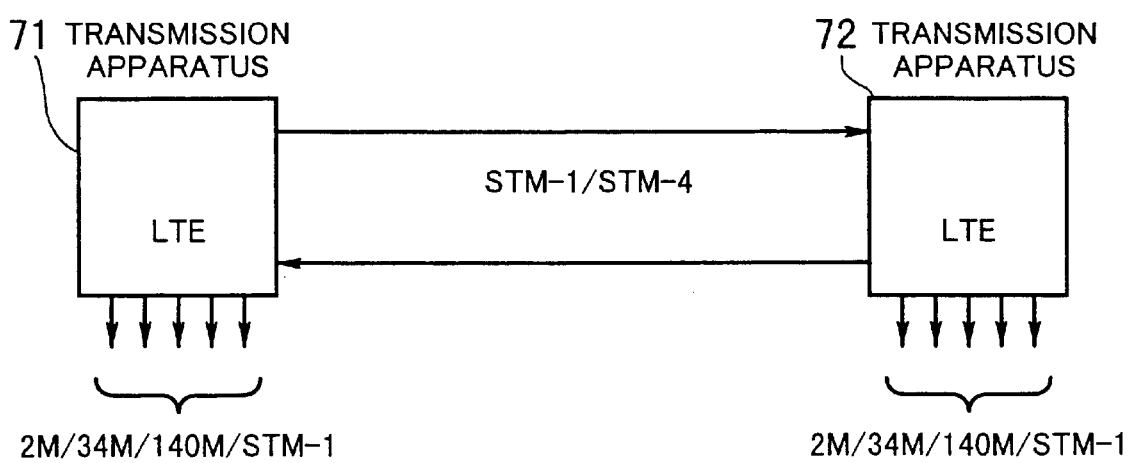
FIG. 17 is a diagram which shows a network in a point-to-point configuration.
Figure 18:
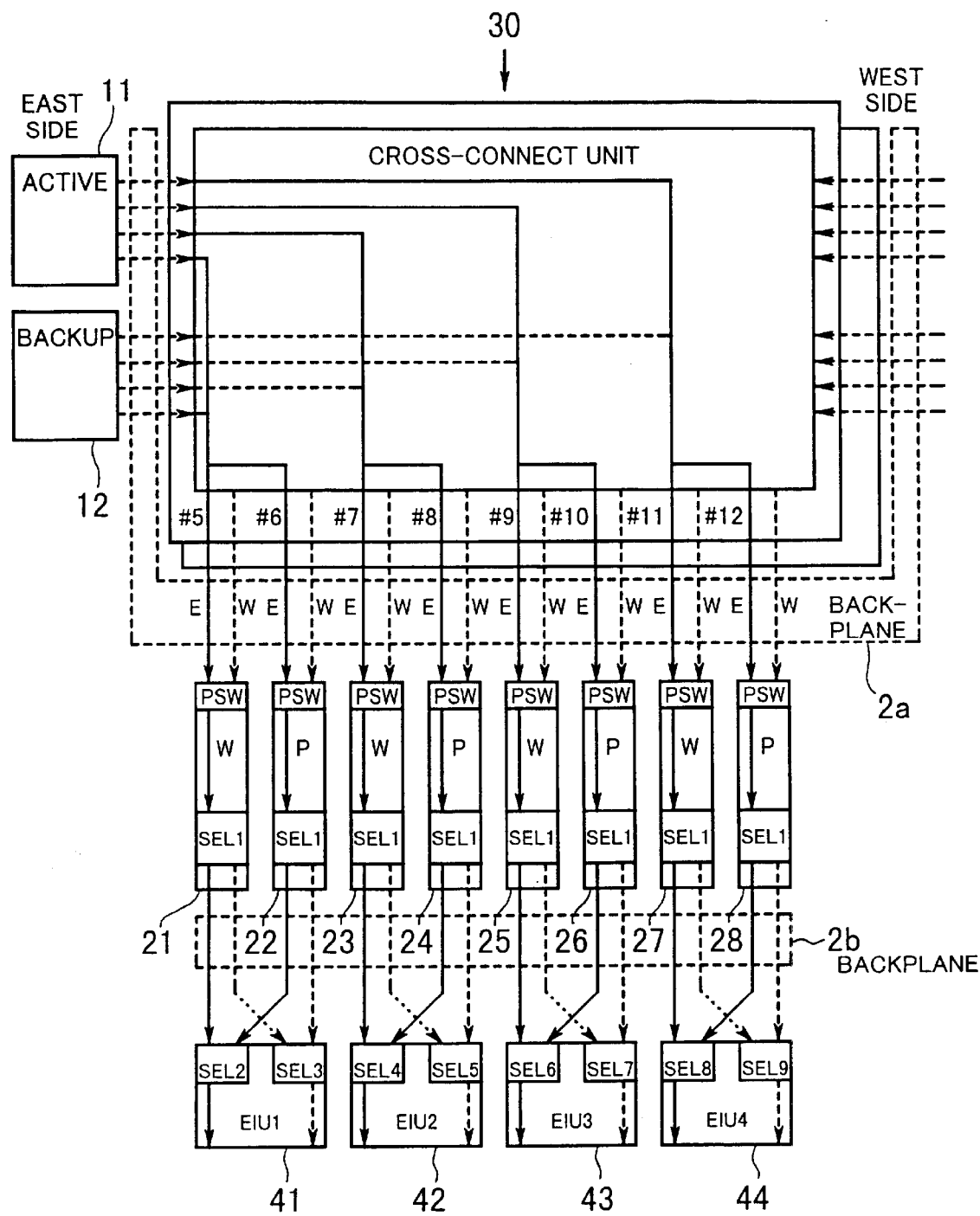
FIG. 18 is a diagram which shows a transmission apparatus of a first embodiment of the present invention.

With reference to FIGS. 17 and 18, a first embodiment of the present invention will now be described below.

FIG. 17 shows a network configured for a point-to-point service, to which the first embodiment is applied. This point-to-point network involves only two transmission apparatus 71 and 72, which are called "Line Terminating Equipment (LTE)" in the SDH terminology.

FIG. 18 shows the internal structure of a transmission apparatus of the first embodiment. In this first embodiment, two high-order group units 11 and 12 are installed in the slots SL4 and SL5 of the mounting rack 1 of FIG. 2 to serve as an active unit and a backup unit, respectively. They are STM-4 units explained in FIG. 13. In the slot SL10 to SL17, on the other hand, eight STM-1 units (FIG. 11) are installed as low-order group units 21 to 28, where the unit with odd reference numerals 21, 23, 25, and 27 serve as active units (labeled "W"), while those with even numerals 22, 24, 26, and 28 serve as backup units (labeled "P").

From the high-order group unit 11 on the east side, the cross-connect unit 30 receives four AU-4 signals at its high-order group port 30a (see FIG. 3 for the port arrangement and individual port numbers). With an appropriate setup of its internal switches, the cross-connect unit 30 transfers the received AU-4 signals from the port #1-1 to the ports #11 and #12 as part of the low-order group port 30b. Similarly, it transfers the signals from the high-order group port #1-2 to the low-order group ports #9 and #10; from the port #1-3 to the ports #7 and #8; and from the port #1-4 to the ports #5 and #6. The same cross-connections are made also for the backup high-order group unit 12.

At the front-end portion of the low-order group unit 21 to 28, path switches PSW select their respective east side input lines since there is no signals supplied from the west side ports. After this input selection is made, the low-order group units 21 to 28 convert the signal format from AU-4 to STM-1.

The resultant STM-1 signals are then supplied to the interface units 41 to 44 through selectors SEL1 disposed at the output portion of the low-order group units 21 to 28 as indicated by the solid arrows in FIG. 18. More specifically, the low-order group units 21 and 22 supply their respective outputs to the selector SEL2 of the interface unit 41 (EIU-1), through the output selector SEL1 and the backplane connection 2b. Likewise, the low-order group units 23 and 24 supply their respective outputs to the selector SEL4 of the interface unit 42 (EIU-4). The low-order group units 25 and 26 supply their respective outputs to the selector SEL6 of the interface unit 43 (EIU-3). The low-order group units 27 and 28 supply their respective outputs to the selector SEL8 of the interface unit 44 (EIU-4). As a result, each of the interface units 41 to 44 has two identical signals, one from an active low-order group transmission unit and the other from a backup low-order group transmission unit. The input selectors SEL2, SEL4, SEL6, and SEL8 of the interface units 41 to 44 choose the signals coming from the active units ("W"), as long as the active units are operational.

As an alternative system configuration of the first embodiment, 140M units of FIG. 9 can be installed as the low-order group units 21 to 28, instead of using STM-1 units. In this case, the units conducts a format conversion from AU-4 to 138.264 Mb/s PDH signals. The low-order group units 21 to 28 can also be replaced with 34M units of FIG. 7, in which case they convert AU-4 frames to 34.368 Mb/s PDH signals.

Moreover, the first embodiment of FIG. 18 can be modified variously in terms of the number of low-order group units installed in the module slots 3. That is, it is possible to configure the transmission apparatus to have only one pair of active and backup low-order group units, instead of fully furnishing it with four active-backup unit pairs.

Further, the number of low-order group units can be two or three pairs, if appropriate. Still another possible modification is to install high-order group units 13 and 14 into slots SL6 and SL7, instead of inserting high-order group units 11 and 12 into slots SL4 and SL5. In this case, however, the path switches PSW included in the low-order group units 21 to 28 should be programmed to select input signals supplied from the west side ports.

Furthermore, the transmission apparatus of the first embodiment can be modified to eliminate the backup high-order group unit 12, instead of installing two high-order group units 11 and 12 as an active and backup units, respectively. In this case, however, the dual redundancy capability is lost with respect to the high-order group units.

Figure 19:
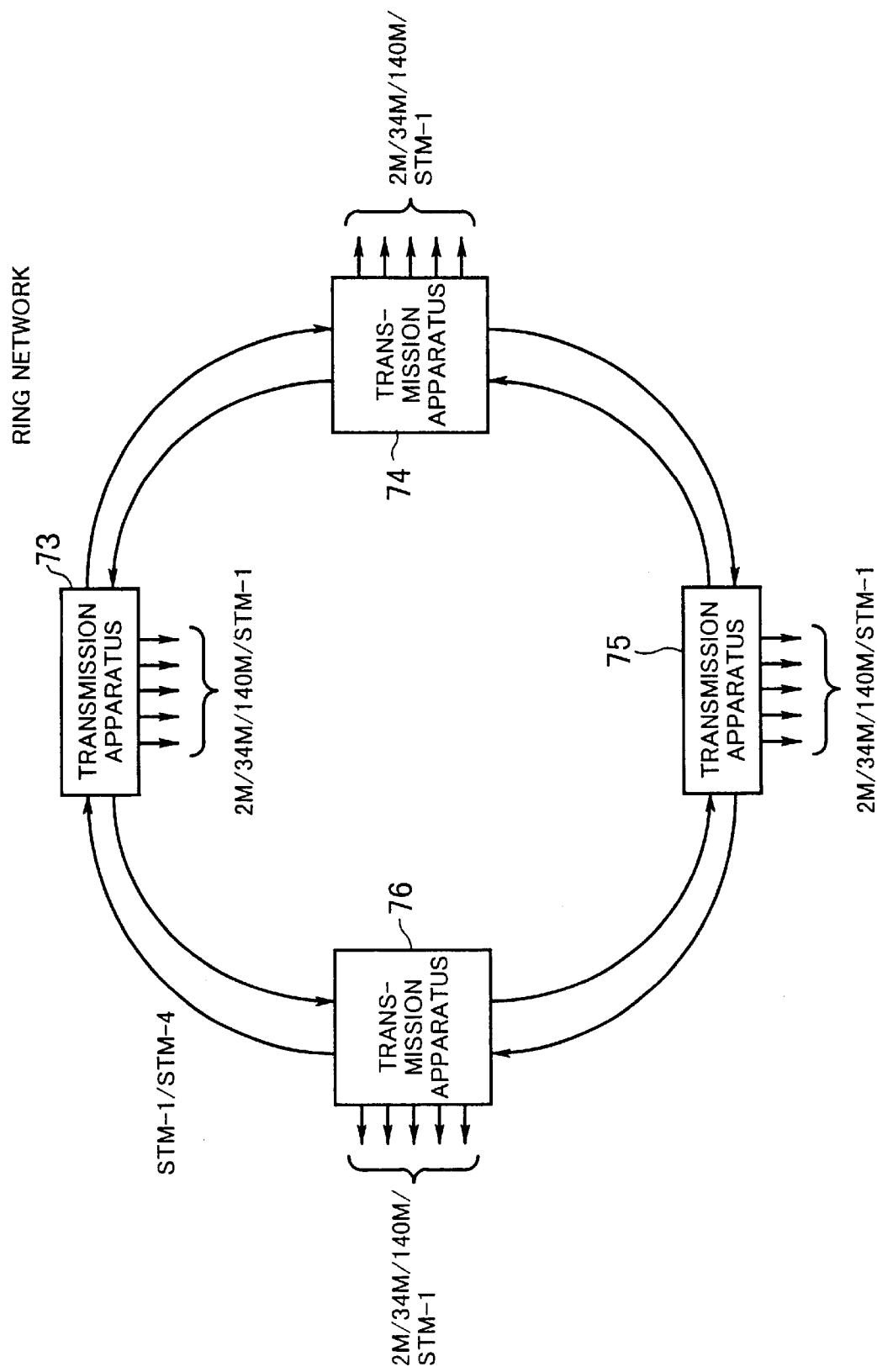
FIG. 19 is a diagram which shows a network in a ring configuration.
Figure 20:
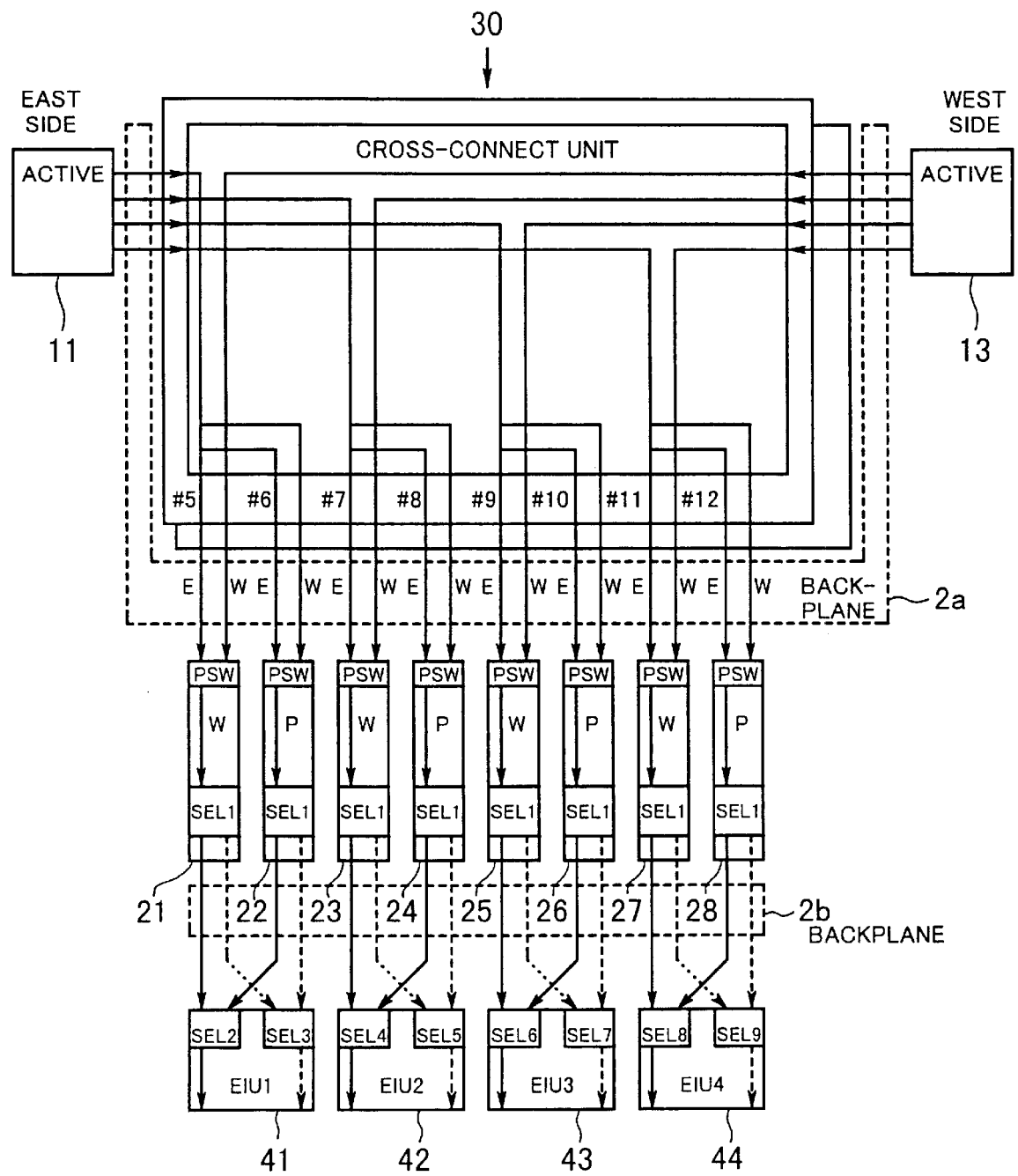
FIG. 20 is a diagram which shows a transmission apparatus of a second embodiment.

Referring next to FIGS. 19 and 20, the following section will describe a second embodiment of the present invention.

FIG. 19 shows a network configured in a ring topology. The second embodiment of the present invention applies to this ring network which interconnects, for example, four transmission apparatus 73 to 76 serially in an unbroken circular configuration.

FIG. 20 shows the structure of a transmission apparatus of the second embodiment. This second embodiment differs from the first embodiment in that two high-order group units 11 and 13 are installed into the slots SL4 and SL6. These units 11 and 13 are STM-4 units (FIG. 13), both serving as active units.

Being installed in the slots SL10 to SL17, eight STM-1 units (FIG. 11) operate as the low-order group units 21 to 28 in a dual redundant configuration. The units with odd reference numerals 21, 23, 25, and 27 are active units (labeled "W"), while those with even numerals 22, 24, 26, and 28 are backup units (labeled "P").

The east-side high-order group unit 11 and the west-side high-order group unit 13 each enter four AU-4 signals to the high-order group ports 30a of the cross-connect unit 30 (see FIG. 3 for the port arrangement and individual port numbers). With an appropriate setup of its internal switches, the cross-connect unit 30 transfers the signals from the east side port #1-1 to the low-order group ports #5 and #6.

Similarly, it transfers the signals from the port #1-2 to the ports #7 and #8; from the port #1-3 to the ports #9 and #10; and from the port #1-4 to the ports #11 and #12. It also transfers the reception signals from the west side port #3-1 to the low-order group ports #5 and #6. Similarly, it transfers the signals from the port #3-2 to the ports #7 and #8; from the port #3-3 to the ports #9 and #10; and from the port #3-4 to the ports #11 and #12.

The cross-connect unit 30 supplies those east-side and west-side output signals to the low-order group units 21 to 28. At the front-end portion of each low-order group unit, the path switch PSW selects either the east-side or the west-side signal in accordance with selection commands produced from alarm information, etc. After making this input selection, the low-order group units 21 to 28 convert the signal format from AU-4 to STM-1. The output selectors SEL1 in the low-order group units 21 and 22 then send the resultant STM-1 signals to the selector SEL2 contained in the interface unit 41 (EIU1). Similarly, the selectors SEL1 in the low-order group units 23 and 24 send the converted signals to the selector SEL4 in the interface unit 42 (EIU2). The low-order group units 25 and 26 supply their respective outputs to the selector SEL6 of the interface unit 43 (EIU-3). The selector SEL1 in the low-order group units 27 and 28 send the converted signals to the selector SEL8 in the interface unit 44 (EIU4).

As a result, each of the interface units 41 to 44 (EIU1 to EIU4) receives two identical signals, one from an active low-order group transmission unit ("W") and the other from a backup low-order group transmission unit ("P"). Their input selectors SEL2, SEL4, SEL6, and SEL8 choose the signals from the active units.

As an alternative system configuration of the second embodiment, 140M units (FIG. 9) or 34M units (FIG. 7) can be used as the low-order group units 21 to 28, in place of the STM-1 units. In this case, the low-order group units 21 to 28 convert AU-4 frames to 138.264 Mb/s or 34.368 Mb/s PDH signals. The second embodiment can also be modified variously in terms of the number of low-order group units installed in the module slots 3. That is, the transmission apparatus can be configured to have only one set of active and backup low-order group units, instead of having four active-backup unit pairs. Further, the number of low-order group units can be two or three pairs, if appropriate. Still another possible modification concerning the second embodiment is to install high-order group units 12 and 14 into the slots SL5 and SL7, instead of inserting the high-order group units 11 and 13 into the slots SL4 and SL6.

Figure 21:
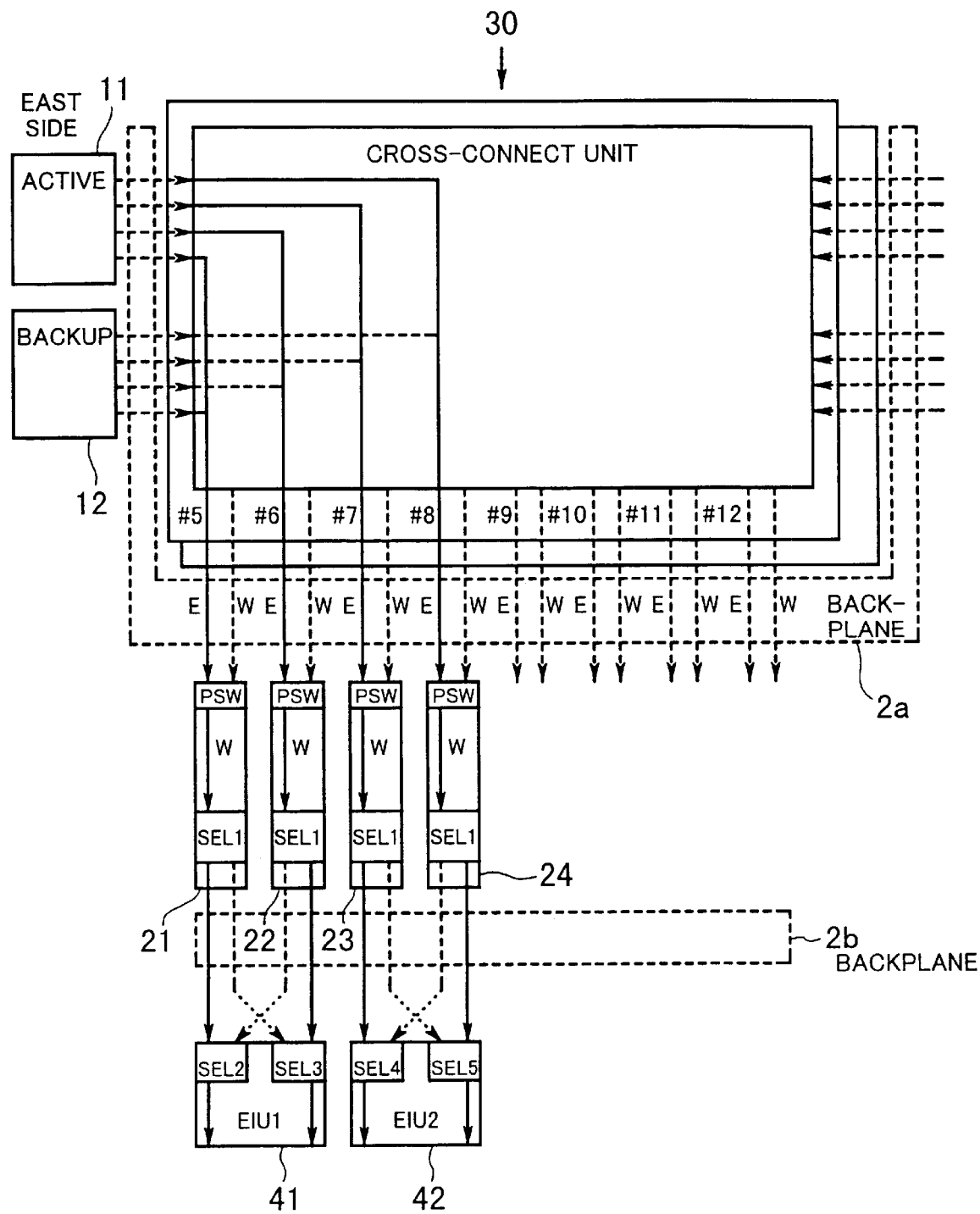
FIG. 21 is a diagram which shows a transmission apparatus of a third embodiment.

Referring next to FIG. 21, the following section will describe a third embodiment of the present invention. This third embodiment applies to a point-to-point network of FIG. 17.

FIG. 21 shows a transmission apparatus of the third embodiment, in which two high-order group units 11 and 12 are installed in the slots SL4 and SL5 (FIG. 2) as in the first embodiment. More specifically, two STM-4 units (FIG. 13) are used to provide a dual redundancy capability; the high-order group unit 11 serves as an active unit, while the other high-order group unit 12 serves as a backup unit. On the other hand, four STM-1 units (FIG. 11) are installed in the slots SL10 to SL13 as low-order group units 21 to 24, all of which are active units ("W").

From the active high-order group unit 11 on the east side, the cross-connect unit 30 receives four AU-4 signals through its high-order group port 30a (see FIG. 3 for the port arrangement and individual port numbers). With an appropriate setup of its internal switches, the cross-connect unit 30 transfers the signals from the east side port #1-1 to the port #8 of the low-order group port 30b. Similarly, it transfers the entered signals from the port #1-2 to the port #7; from the port #1-3 to the port #6; and from the port #1-4 to the ports #5. The same cross-connections are provided with respect to the backup high-order group unit 12.

At the front-end portion of the low-order group units 21 to 24, path switches PSW select their respective east-side input lines since there is no signals supplied from the west side ports. The low-order group units 21 to 24 then convert the signals from AU-4 to STM-1. After this format conversion is finished, the output selector SEL1 in the low-order group unit 21 then sends the resultant STM-1 output signal to a selector SEL2 disposed at the front end of the interface unit 41 (EIU1). Likewise, the output selector SEL1 in the low-order group unit 22 sends its STM-1 output signal to another selector SEL3 of the same interface unit 41 (EIU1). The selector SEL1 in the low-order group unit 23 sends its STM-1 output signal to a selector SEL4 of the interface unit 42 (EIU2). The selector SEL1 in the low-order group unit 24 sends its STM-1 output signal to another selector SEL5 of the same interface unit 42 (EIU2).

Note here that, in contrast to the first embodiment, the third embodiment employs only two interface units 41 and 42 (EIU1 and EIU2) out of four units 41 to 44 (EIU1 to EIU4). Since no redundancy design is implemented in the low-order group units, the selectors SEL2 to SEL5 will simply output the signals that they receive.

As an alternative system configuration of the third embodiment, 140M units (FIG. 9) or 34M units (FIG. 7) can be used as the low-order group units 21 to 24, in place of the present STM-1 units. In this case, the low-order group units 21 to 24 convert AU-4 frames to 138.264 Mb/s or 34.368 Mb/s PDH signals. Still another possible alternative concerning the third embodiment is to install high-order group units 13 and 14 into the slots SL6 and SL7, instead of inserting high-order group units 11 and 12 into the slots SL4 and SL5. In this case, however, each path switch PSW included in the low-order group units 21 to 24 should be configured to select input signals supplied from the west side ports. Furthermore, the transmission apparatus of the third embodiment can be modified to eliminate the backup high-order group unit 12, instead of installing two high-order group units 11 and 12 as an active and backup units.

Figure 22:
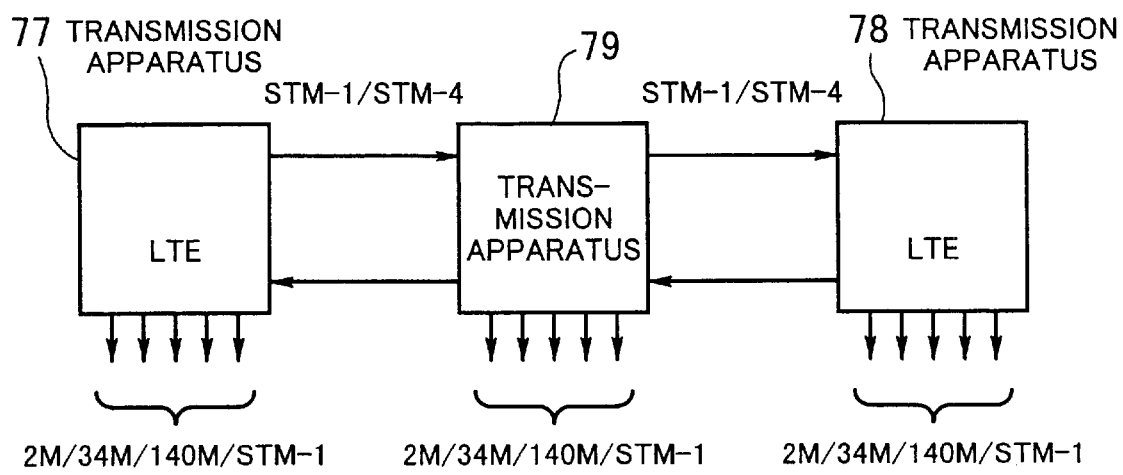
FIG. 22 is a diagram which shows a network in a linear configuration.
Figure 23:
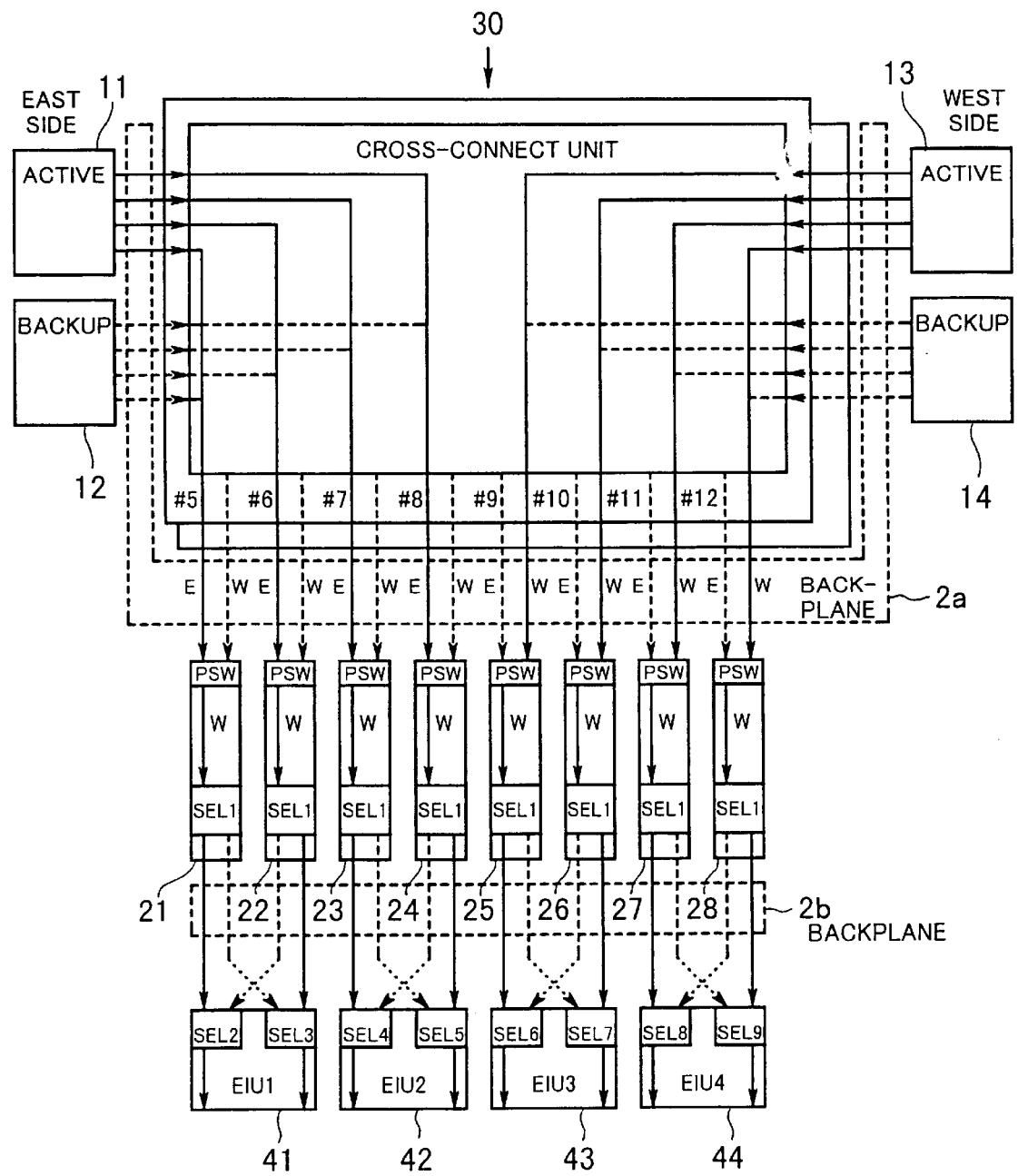
FIG. 23 is a diagram which shows a transmission apparatus of a fourth embodiment.

Referring next to FIGS. 22 and 23, the following section will describe a fourth embodiment of the present invention.

FIG. 22 illustrates a network in a linear configuration, where the fourth embodiment is applicable. In this configuration, three transmission apparatus 77 to 79, for example, are cascaded in a serial fashion. Two terminal transmission apparatus 77 and 78 are what is called "Line Terminating Equipment (LTE)" in the SDH terminology. The fourth embodiment applies to the transmission apparatus 79 being placed at the intermediary point.

FIG. 23 shows a transmission apparatus of the fourth embodiment, in which four high-order group units 11 to 14 are fully installed in the slots SL4 to SL7 (FIG. 2). More specifically, four STM-4 units (FIG. 13) are used to provide a dual redundancy capability; the high-order group units 11 and 13 are active units, while the other units 12 and 14 are backup units. On the other hand, the slots SL10 to SL17 accommodates eight low-order group units 21 to 28. All these units are STM-1 units described in FIG. 11, now working as active units ("W").

From the high-order group unit 11 on the east side, the cross-connect unit 30 receives four AU-4 signals through its high-order group port 30a (see FIG. 3 for the port arrangement and individual port numbers). With an appropriate setup, the cross-connect unit 30 transfers the reception signals from the east side port #1-1 to the port #8 as part of the low-order group ports 30b. Similarly, it transfers signals from the port #1-2 to the port #7; from the port #1-3 to the port #6; and from the port #1-4 to the port #5. It also transfers the reception signals from the west side port #3-1 to the port #9 as part of the low-order group ports 30b. Similarly, it transfers signals from the port #3-2 to the port #10; from the port #3-3 to the port #11; and from the port #3-4 to the port #12. The same cross-connections are made for the backup high-order group units 12 and 14.

At the front-end portion of the low-order group units 21 to 24, the path switches PSW select their respective east-side input lines, since there is no signals supplied to them from the west side ports. On the other hand, the path switches PSW of the remaining low-order group units 25 to 28 select their respective west-side input lines, since there is no signals supplied to them from the east side ports.

The low-order group units 21 to 28 convert AU-4 frames to STM-1 frames. After the format conversion is finished, the output selector SEL1 in the low-order group unit 21 sends its STM-1 output signal to a selector SEL2 disposed at the front end of the interface unit 41 (EIU1). Likewise, the output selector SEL1 in the low-order group unit 22 sends its STM-1 output signal to another selector SEL3 of the same interface unit 41 (EIU1). The selectors SEL1 in the low-order group units 23 and 24 send their respective output signals to selectors SEL4 and SEL5 disposed at the front end of the next interface unit 42 (EIU2). The low-order group units 25 and 26 supply their respective outputs to selectors SEL6 and SEL7 of the third interface unit 43 (EIU-3), and the low-order group units 27 and 28 supply their respective outputs to selectors SEL8 and SEL9 of the fourth interface unit 44 (EIU-4). Since no redundancy is implemented in the low-order group units, all the selectors SEL2 to SEL9 will simply output the signals that they receive.

As an alternative system configuration of the fourth embodiment, 140M units (FIG. 9) or 34M units (FIG. 7) can be used as the low-order group units 21 to 28, in place of the present STM-1 units. In this case, the low-order group units 21 to 28 execute a format conversion from AU-4 frames to 138.264 Mb/s or 34.368 Mb/s PDH signals. Furthermore, the transmission apparatus of the fourth embodiment can be modified to eliminate the backup high-order group units 12 and 14, instead of fully installing four high-order group units 11 to 14 to achieve dual redundancy.

Figure 24:
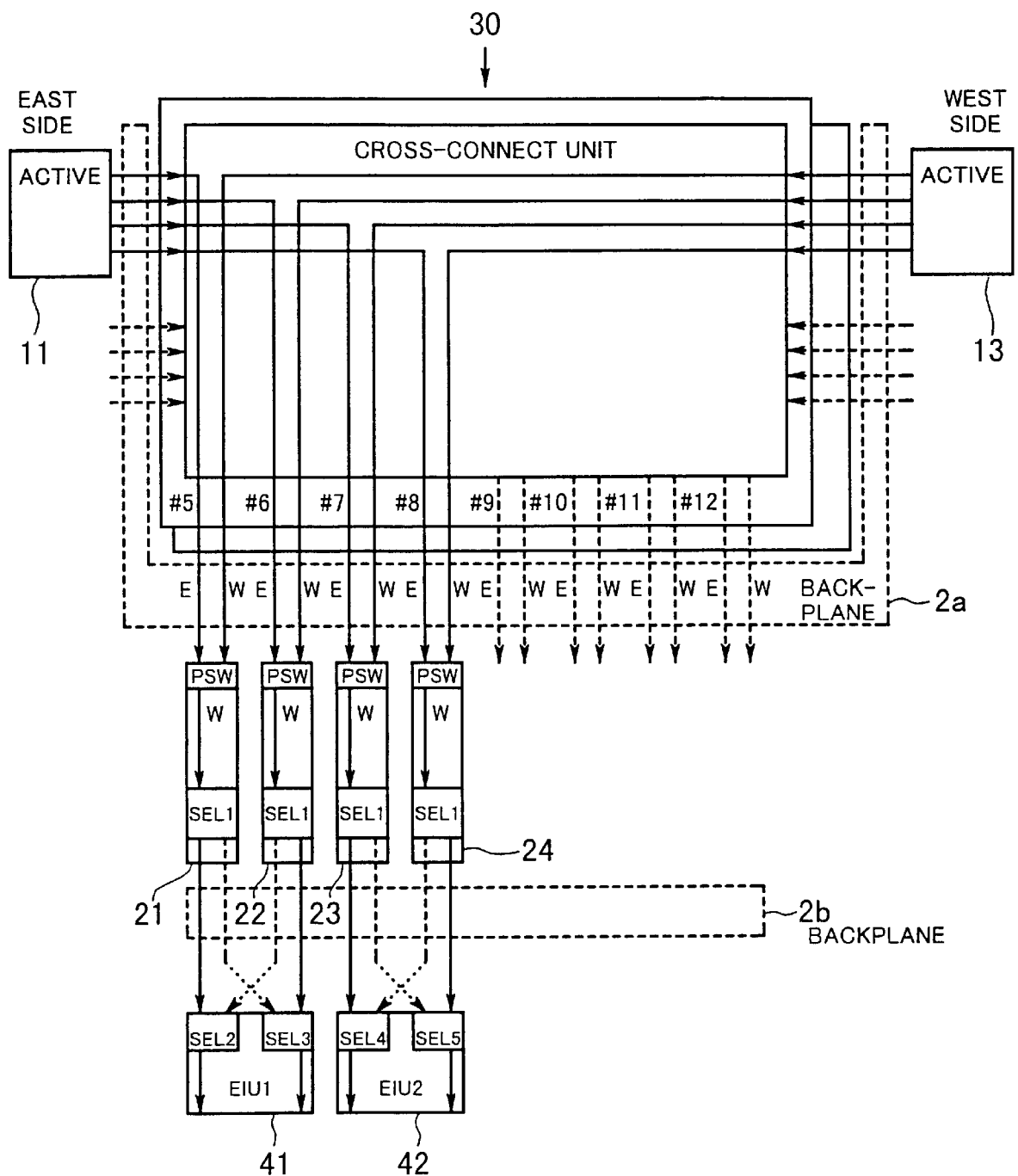
FIG. 24 is a diagram which shows a transmission apparatus of a fifth embodiment.

Referring next to FIG. 24, the following section will describe a fifth embodiment of the present invention.

The fifth embodiment applies to a ring network of FIG. 19. FIG. 24 shows a transmission apparatus of the fifth embodiment, in which two high-order group units 11 and 13 are installed in the slots SL4 and SL6 (FIG. 2). More specifically, these high-order group units 11 and 13 are both STM-4 units (FIG. 13) to serve as active units. On the other hand, four STM-1 units (FIG. 11) are installed in the slots SL10 to SL13 as low-order group units 21 to 24, all of which work as active units ("W").

The east-side high-order group unit 11 and the west-side high-order group unit 13 each enter four AU-4 signals to the high-order group port 30a of the cross-connect unit 30 (see FIG. 3 for the port arrangement and individual port numbers). With an appropriate setup, the cross-connect unit 30 transfers the reception signals from the east side port #1-1 to the port #5 as part of the low-order group ports 30b. Similarly, it transfers the signals from the port #1-2 to the port #6; from the port #1-3 to the port #7; and from the port #1-4 to the port #8. The cross-connect unit 30 also transfers the reception signals from the west side port #3-1 to the port #5 as part of the low-order group ports 30b. Similarly, it transfers signals from the port #3-2 to the port #6; from the port #3-3 to the port #7; and from the port #3-4 to the port #8.

The cross-connect unit 30 supplies these east-side and west-side output signals to the low-order group units 21 to 24. At the front-end portion of each low-order group unit, the path switch PSW selects either the east-side or the west-side signal in accordance with selection commands produced from alarm information, etc. The low-order group units 21 to 24 then convert the signals from AU-4 to STM-1.

After the conversion is finished, the output selector SEL1 in the low-order group unit 21 sends the resultant STM-1 output signal to a selector SEL2 at the front end of the interface unit 41 (EIU1). Likewise, the output selector SEL1 in the low-order group unit 22 sends its STM-1 output signal to another selector SEL3 of the same interface unit 41 (EIU1). The selectors SEL1 in the low-order group units 23 and 24 send their respective outputs to selectors SEL4 and SEL5 of the next interface unit 42 (EIU2). As such, the fifth embodiment uses only two interface units 41 and 42 (EIU1 and EIU2) out of four possible units 41 to 44 (EIU1 to EIU4). Since no redundancy capability is implemented in the low-order group units, the selectors SEL2 to SEL5 will simply output the signals that they receive.

As an alternative system configuration of the fifth embodiment described above, 140M units (FIG. 9) or 34M units (FIG. 7) can be used as the low-order group units 21 to 24, replacing the present STM-1 units. In this case, the low-order group units 21 to 24 convert AU-4 frames to 138.264 Mb/s or 34.368 Mb/s PDH signals. Still another alternative configuration concerning the fifth embodiment is to install high-order group units 12 and 14 into the slots SL5 and SL7, instead of inserting the high-order group units 11 and 13 into the slots SL4 and SL6.

Figure 25:
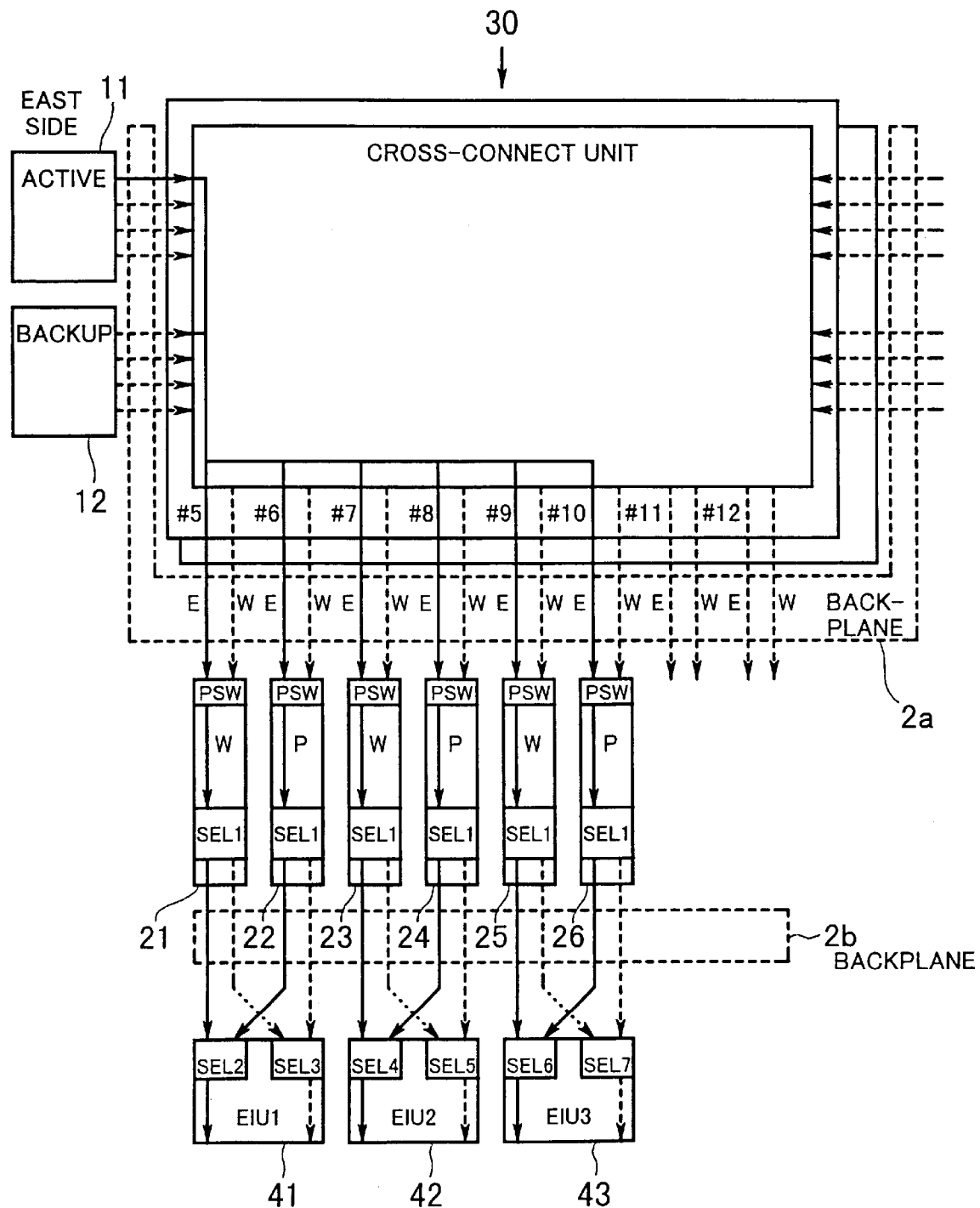
FIG. 25 is a diagram which shows a transmission apparatus of a sixth embodiment.

Referring next to FIG. 25, the following section will describe a sixth embodiment of the present invention.

The sixth embodiment applies to a point-to-point network of FIG. 17. FIG. 25 shows a transmission apparatus of the sixth embodiment, in which two high-order group units 11 and 12 are installed in the slots SL4 and SL5 (FIG. 2). More specifically, two STM-1 units (FIG. 11) are installed to achieve a dual redundancy configuration; the high-order group unit 11 serves an active unit, while the other high-order group unit 12 backs it up. On the other hand, six 2M units (FIG. 5) are installed in the slots SL10 to SL15 as low-order group units 21 to 26, also forming a dual redundant subsystem. The units with odd reference numerals 21, 23, and 25 are active units ("W"), while those with even numerals 22, 24, and 26 are backup units ("P").

From the high-order group unit 11 on the east side, a single AU-4 signal is entered to the cross-connect unit 30 through its high-order group ports 30a (see FIG. 3 for the port arrangement and individual port numbers). With an appropriate setup, the cross-connect unit 30 distributes this reception signal from the east side port #1-1 to six low-order group ports #5 to #10. The same cross-connections are made also for the backup high-order group unit 12.

The path switches PSW of the low-order group units 21 to 26 select their respective east-side input lines since there is no signals supplied from the west side ports. The low-order group units 21 to 26 then convert the signal format from AU-4 to 2.048 Mb/s PDH signals. After the conversion is finished, the output selectors SEL1 of the low-order group units 21 and 22 direct their respective output signals to a selector SEL2 at the front end of the interface unit 41 (EIU1). The selectors SEL1 in the low-order group units 23 and 24 send their respective outputs to a selector SEL4 of the next interface unit 42 (EIU2). The selectors SEL1 in the low-order group units 25 and 26 send their respective outputs to a selector SEL6 of the third interface unit 43 (EIU-3).

As such, the fifth embodiment employs only three interface units 41 to 43 (EIU1 to EIU3) out of four possible units 41 to 44 (EIU1 to EIU4). The interface units 41 to 43 each receive two identical signals, one from an active unit ("W") and the other from a backup unit ("P"). Their input selectors SEL2, SEL4, and SEL6 now choose the signals received from the active units.

The sixth embodiment can be modified variously in terms of the number of low-order group units installed in the module slots 3. That is, it is possible to configure the transmission apparatus to have only one or two sets of active and backup low-order group units, instead of fully installing four active-backup unit pairs. Another alternative configuration is to install high-order group units 13 and 14 into the slots SL6 and SL7, instead of inserting high-order group units 11 and 12 into the slots SL4 and SL5. In this case, however, each path switch PSW included in the low-order group units 21 to 26 should be configured to select an input signal supplied from the west side. Furthermore, the transmission apparatus of the sixth embodiment can be modified to eliminate the backup high-order group unit 12, instead of installing both high-order group units 11 and 12 for dual redundancy.

Now, the next section will describe a seventh embodiment of the present invention.

Figure 26:
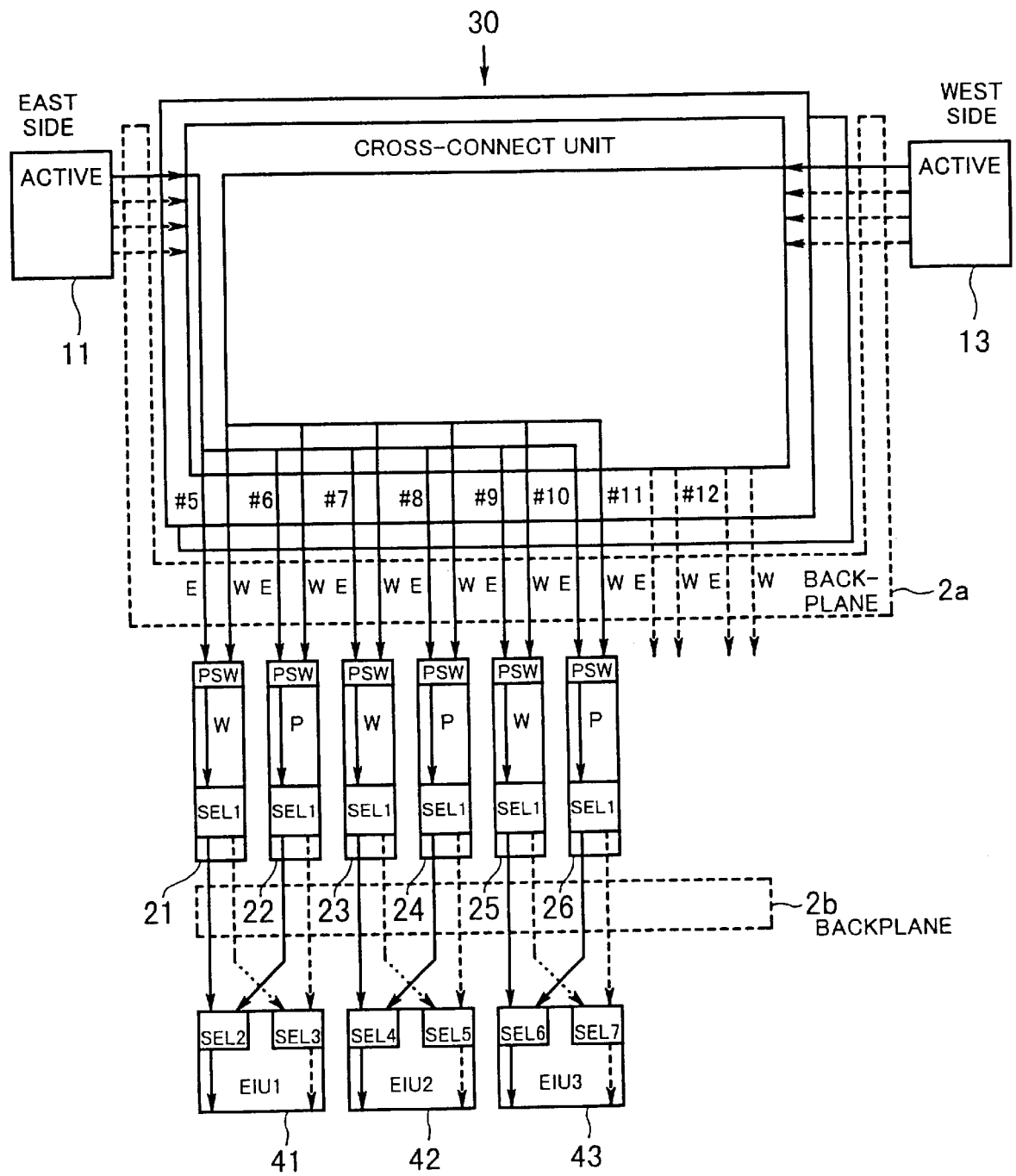
FIG. 26 is a diagram which shows a transmission apparatus of a seventh embodiment.

The seventh embodiment applies to a ring network of FIG. 19. FIG. 26 shows a transmission apparatus of the seventh embodiment, in which two high-order group units 11 and 13 are installed in the slots SL4 and SL6 (FIG. 2). More specifically, these high-order group units 11 and 13 are STM-1 units (FIG. 11), both serving as active units. On the other hand, six 2M units (FIG. 5) are installed in the slots SL10 to SL15 as low-order group units 21 to 26. To achieve a dual redundancy configuration, the units with odd reference numerals 21, 23, and 25 serve as active units ("W"), while those with even numerals 22, 24, and 26 serve as backup units ("P").

From the high-order group unit 11 on the east side, the cross-connect unit 30 receives a single AU-4 signal through its high-order group ports 30a (see FIG. 3 for the port arrangement and individual port numbers). With an appropriate setup, the cross-connect unit 30 distributes this reception signal from the east side port #1-1 to six ports #5 to #10 as part of the low-order group ports 30b. Further, from the high-order group unit 13 on the west side, the cross-connect unit 30 receives another single AU-4 signal through its high-order group ports 30a. The cross-connect unit 30 distributes this reception signal from the west side port #3-1 to the six low-order group ports #5 to #10.

The low-order group units 21 to 26 receive those east-side and west-side output signals from the cross-connect unit 30. Their respective path switches PSW select either the east-side or the west-side signals in accordance with selection commands produced from alarm information, etc. The low-order group units 21 to 26 then convert the AU-4 signal to 2.048 Mb/s PDH signals. After the conversion is finished, the output selectors SEL1 in the low-order group units 21 and 22 send their respective output signals to a selector SEL2 disposed at the front end of the interface unit 41 (EIU1). Likewise, the selectors SEL1 in the low-order group units 23 and 24 send their respective output signals to a selector SEL4 of the next interface unit 42 (EIU2), and those in the low-order group units 25 and 26 send their respective output signals to a selector SEL6 of the third interface unit 43 (EIU-3).

As such, the seventh embodiment employs three interface units 41 to 43 (EIU1 to EIU3) out of four possible units 41 to 44 (EIU1 to EIU4), and each of them receives two identical signals, one from an active unit ("W") and the other from a unit ("P"). Their input selectors SEL2, SEL4, and SEL6 now select the signals received from the active units.

As an alternative configuration concerning the seventh embodiment of FIG. 26, it is possible to install high-order group units 12 and 14 into the slots SL5 and SL7, instead of inserting high-order group units 11 and 13 into the slots SL4 and SL6. Further, the seventh embodiment can be modified variously in terms of the number of low-order group units installed in the module slots 3. That is, it is possible to configure the transmission apparatus to have only one or two pairs of active and backup low-order group units, instead of installing six such pairs.

Now, the next section will describe an eighth embodiment of the present invention, which is applicable to a point-to-point network of FIG. 17.

Figure 27:
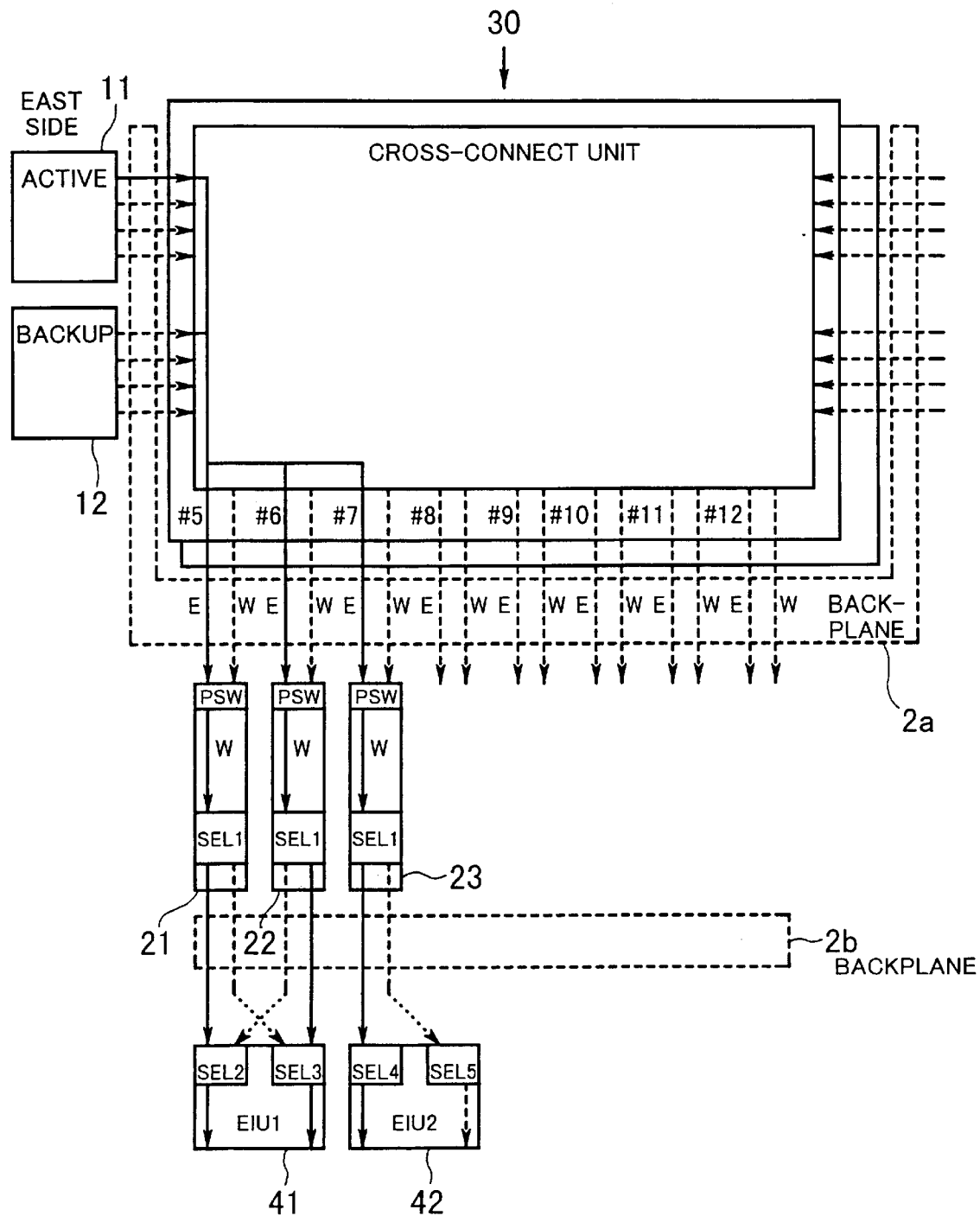
FIG. 27 is a diagram which shows a transmission apparatus of an eighth embodiment.

FIG. 27 shows a transmission apparatus of the eighth embodiment, in which two high-order group units 11 and 12 are installed in the slots SL4 and SL5 (FIG. 2). More specifically, two STM-1 units (FIG. 11) are installed to provide a dual redundancy configuration; one high-order group unit 11 serves an active unit, while the other high-order group unit 12 serves as a backup unit. On the other hand, three 2M units (FIG. 5) are installed in the slots SL10 to SL12 as low-order group units 21 to 23. All these units 21 to 23 serve as active units ("W").

From the-high-order group unit 11 on the east side, the cross-connect unit 30 receives a single AU-4 signal through its high-order group ports 30a (see FIG. 3 for the port arrangement and individual port numbers). With an appropriate setup, the cross-connect unit 30 distributes the reception signal from the east side port #1-1 to three low-order group ports #5 to #7. The same cross-connections are made also for the backup high-order group unit 12.

The path switches PSW contained in the low-order group units 21 to 23 select their respective east-side input lines since there are no signals supplied from the west side ports. The low-order group units 21 to 23 then convert the AU-4 signals to 2.048 Mb/s PDH signals. After the conversion is finished, the output selector SEL1 in the low-order group unit 21 sends its output signal to a selector SEL2 disposed at the front end of the interface unit 41 (EIU1). Likewise, the output selector SEL1 in the next low-order group unit 22 sends its output signal to another selector SEL3 of the same interface unit 41 (EIU1). The selectors SEL1 in the third low-order group unit 23 sends its output signal to a selector SEL4 of the next interface unit 42 (EIU2). As such, the eighth embodiment employs only two interface units 41 and 42 (EIU1 and EIU2) out of four possible units 41 to 44 (EIU1 to EIU4). Since no redundancy design is implemented in the low-order group units, their selectors SEL2, SEL3, and SEL4 will simply output the signals that they receive.

As an alternative configuration concerning the eighth embodiment of FIG. 27, it is possible to install high-order group units 13 and 14 into the slots SL6 and SL7, instead of inserting high-order group units 11 and 12 into the slots SL4 and SL5. In this case, however, each path switch PSW included in the low-order group units 21 to 23 should be configured to select an input signal supplied from the west side. Furthermore, the transmission apparatus of the eighth embodiment can be modified to eliminate the backup high-order group unit 12, instead of installing both units 11 and 12 to implement a dual redundancy configuration.

Now, the next section will describe a ninth embodiment of the present invention, which is applicable to a linear network of FIG. 22.

Figure 28:
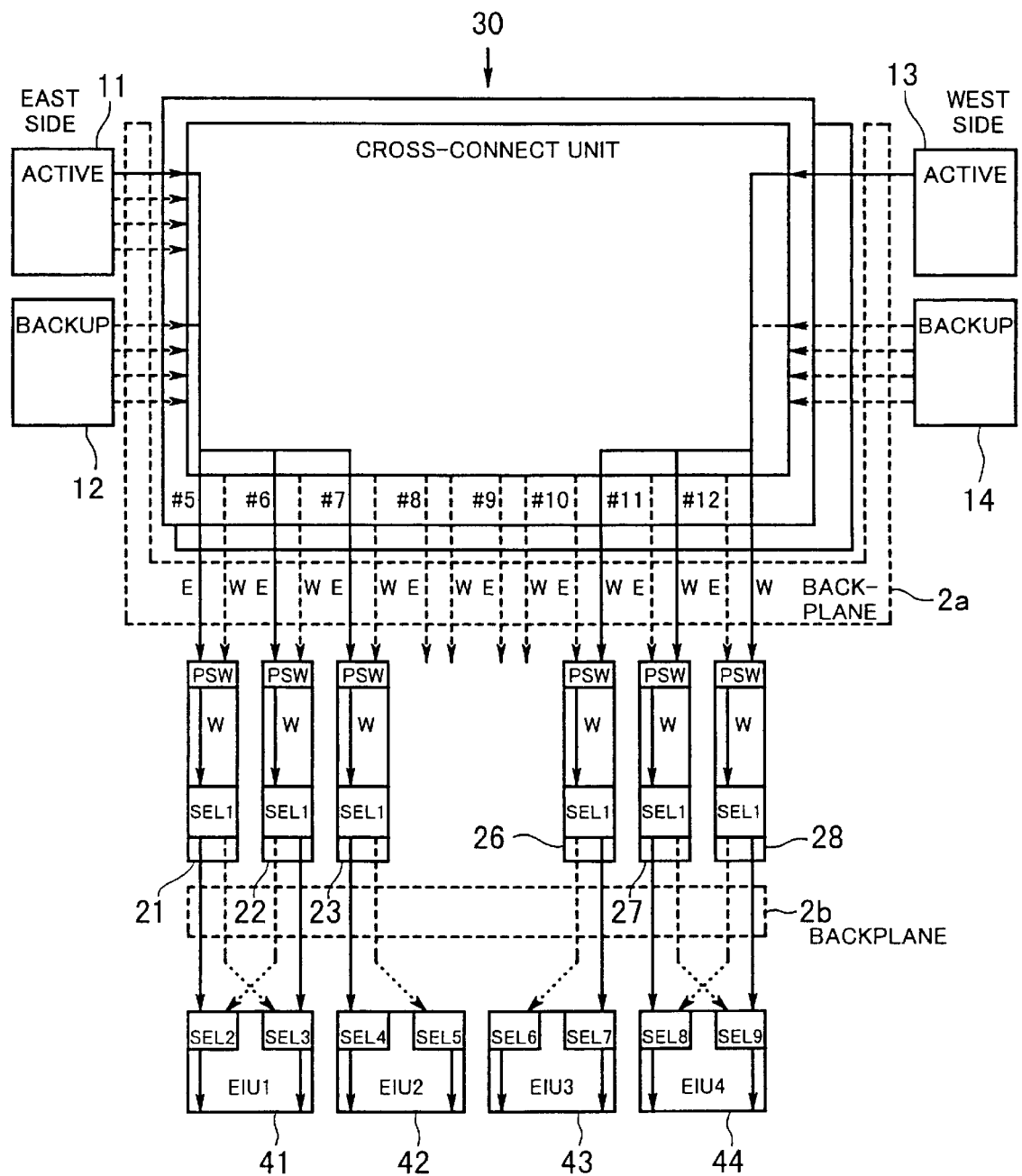
FIG. 28 is a diagram which shows a transmission apparatus of a ninth embodiment.

FIG. 28 is a diagram which shows a transmission apparatus of the ninth embodiment, in which four high-order group units 11 to 14 are installed in the slots SL4 and SL7 (FIG. 2). More specifically, four STM-1 units (FIG. 11) are installed to provide a dual redundancy capability; the high-order group units 11 and 13 serve as active units, while the other high-order group units 12 and 14 serve as backup units. On the other hand, six 2M units (FIG. 5) are installed in the slots SL10 to SL12 and SL15 to SL17, functioning as low-order group units 21 to 23 and 26 to 28, respectively. Note that all these units are active units ("W").

From the high-order group unit 11 on the east side, the cross-connect unit 30 receives a single AU-4 signal through its high-order group port 30a (see FIG. 3 for the port arrangement and individual port numbers). Similarly, it receives another single AU-4 signal from the high-order group unit 13 on the west side. With an appropriate setup of its internal switches, the cross-connect unit 30 distributes the reception signal from the east side port #1-1 to three ports #5 to #7 among the low-order group ports 30b. The cross-connect unit 30 also distributes the other signal received from the west side port #3-1 to three ports #10 to #12 among the low-order group ports 30b. The same cross-connections are programmed with respect to the backup high-order group units 12 and 14.

Path switches PSW contained in the low-order group units 21 to 23 select their respective east-side input lines, since there are no signals supplied from the west side ports. In contrast to this, path switches PSW in the other three low-order group units 26 to 28 select their respective west-side input lines, since no signals are supplied from the east side ports. The low-order group units 21 to 23 and 26 to 28 then convert the AU-4 signals to 2.048 Mb/s PDH signals. After the conversion is finished, the output selector SEL1 in the low-order group unit 21 sends its output signal to a selector SEL2 at the front end of the interface unit 41 (EIU1). Likewise, the output selector SEL1 in the next low-order group unit 22 sends its output signal to another selector SEL3 of the same interface unit 41 (EIU1). The selector SEL1 in the low-order group unit 23 sends its output signal to a selector SEL4 of the next interface unit 42 (EIU2). Further, the selector SEL1 in the low-order group unit 26 sends its output signal to a selector SEL7 of the third interface unit 43 (EIU3), while the selectors SEL1 in the low-order group units 27 and 28 send their respective output signals to selectors SEL8 and SEL9 of the fourth interface unit 44 (EIU4), respectively. Since no redundancy design is implemented in the low-order group units in this ninth embodiment, the selectors SEL2 to SEL4 and SEL6 to SEL9 will simply output the signals that they receive.

An alternative configuration, the transmission apparatus of the ninth embodiment can be modified to eliminate the backup high-order group units 12 and 14, instead of fully installing four high-order group units 11 to 14 for dual redundancy.

Now, the next section will describe a tenth embodiment of the present invention, which is applicable to a ring network of FIG. 19.

Figure 29:
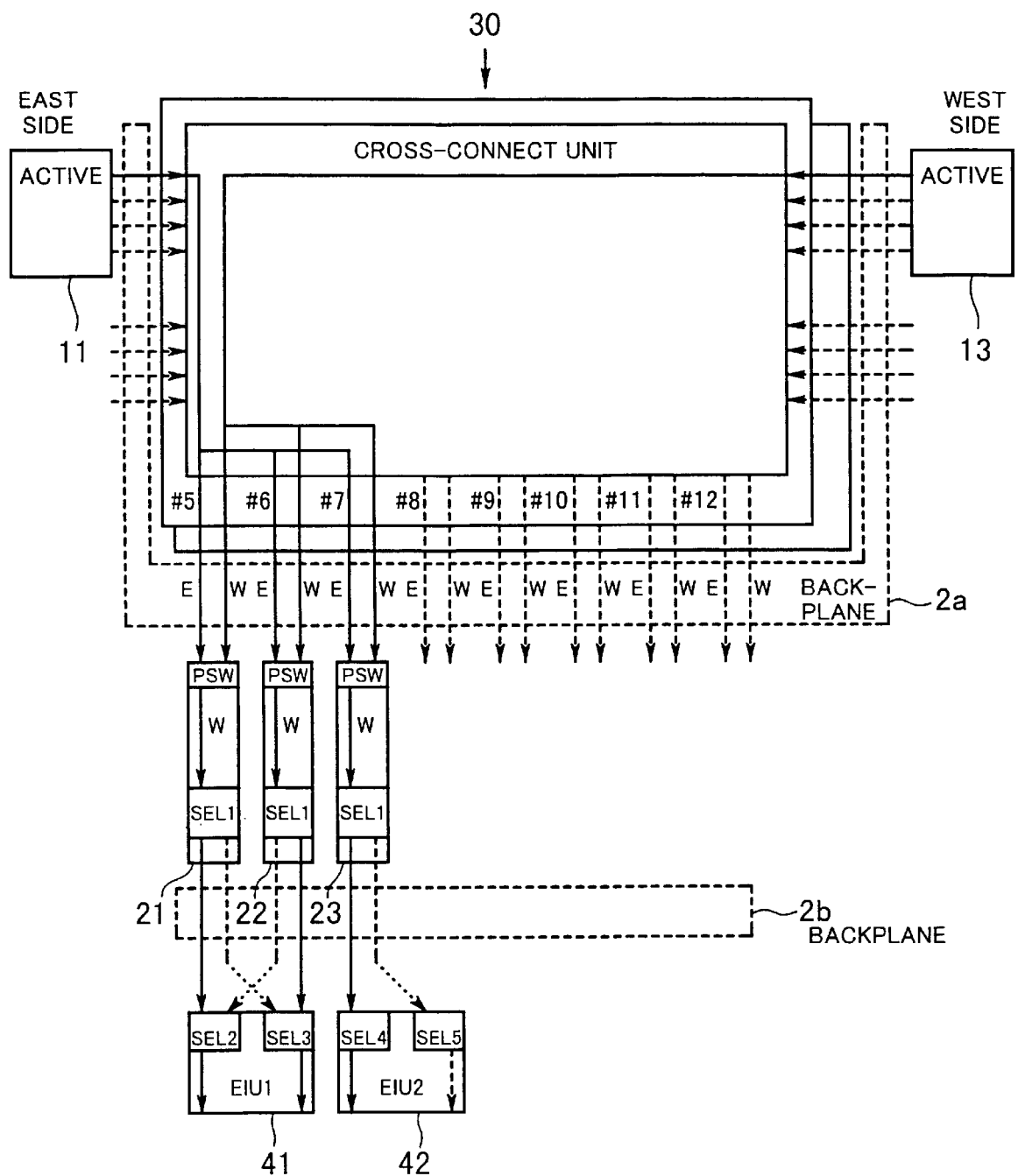
FIG. 29 is a diagram which shows a transmission apparatus of a tenth embodiment.
Figure 30:
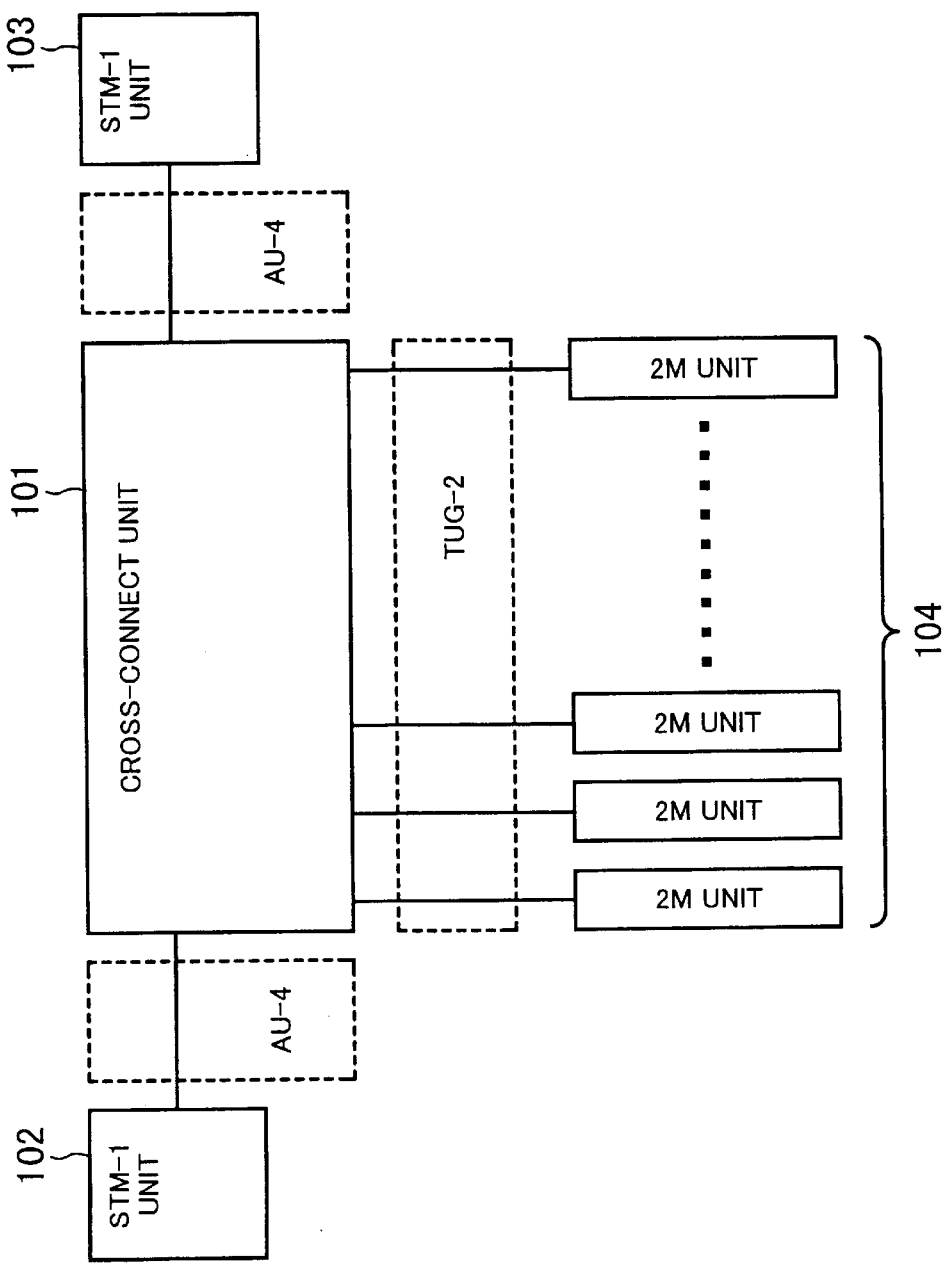
FIG. 30 is a diagram showing a transmission apparatus which has a cross-connect unit to interconnect high-level group units including two STM-1 units, and low-order group units including a plurality of 2M units.
Figure 31:
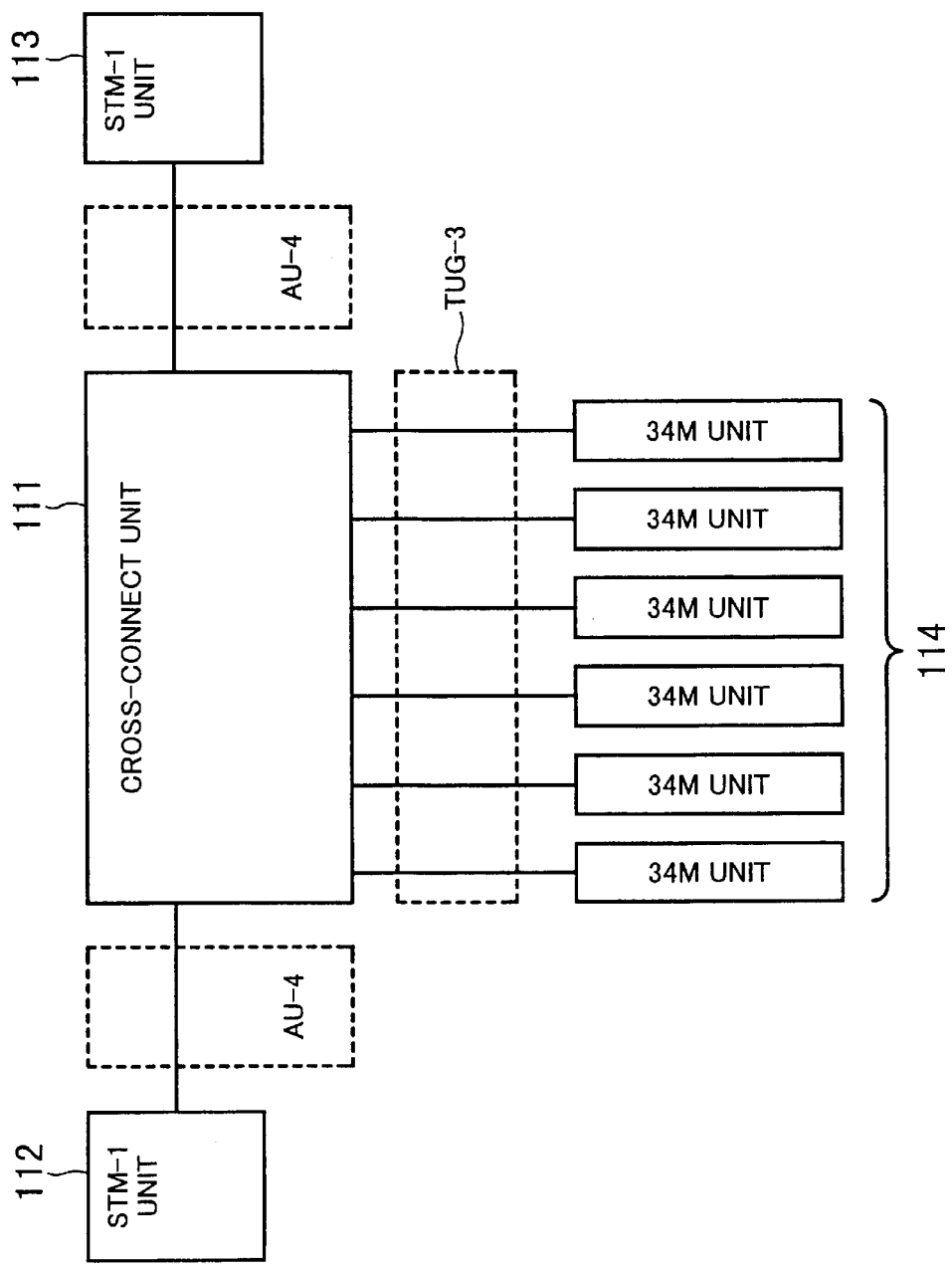
FIG. 31 is a diagram showing a transmission apparatus which has a cross-connect unit to interconnect high-level group units including two STM-1 units, and low-order group units including a plurality of 34M units.
Figure 32:
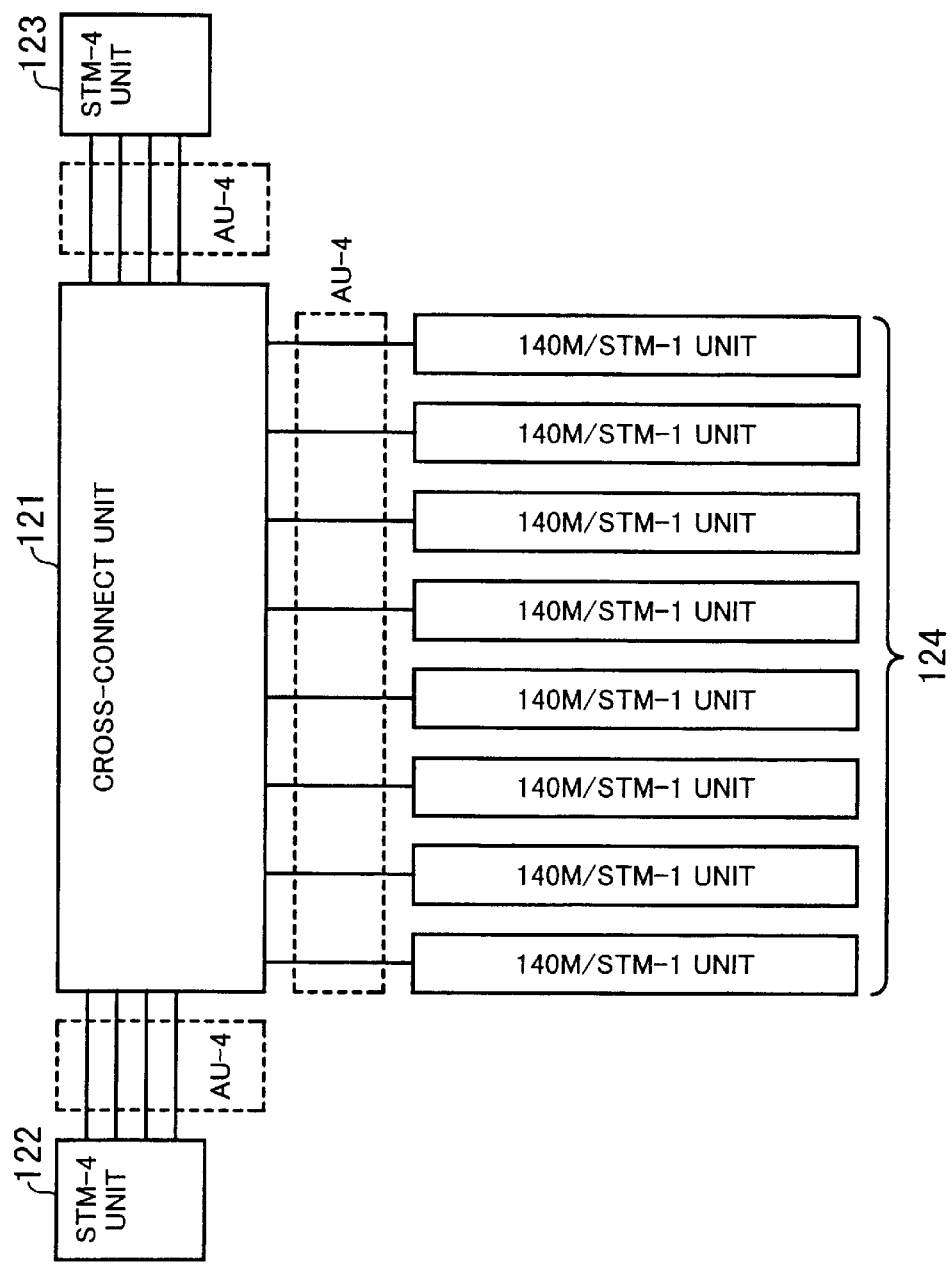
FIG. 32 is a diagram showing a transmission apparatus which has a cross-connect unit to interconnect high-level group units including two STM-4 units, and low-order group units including a plurality of 140M/STM-1 units.
Figure 33:
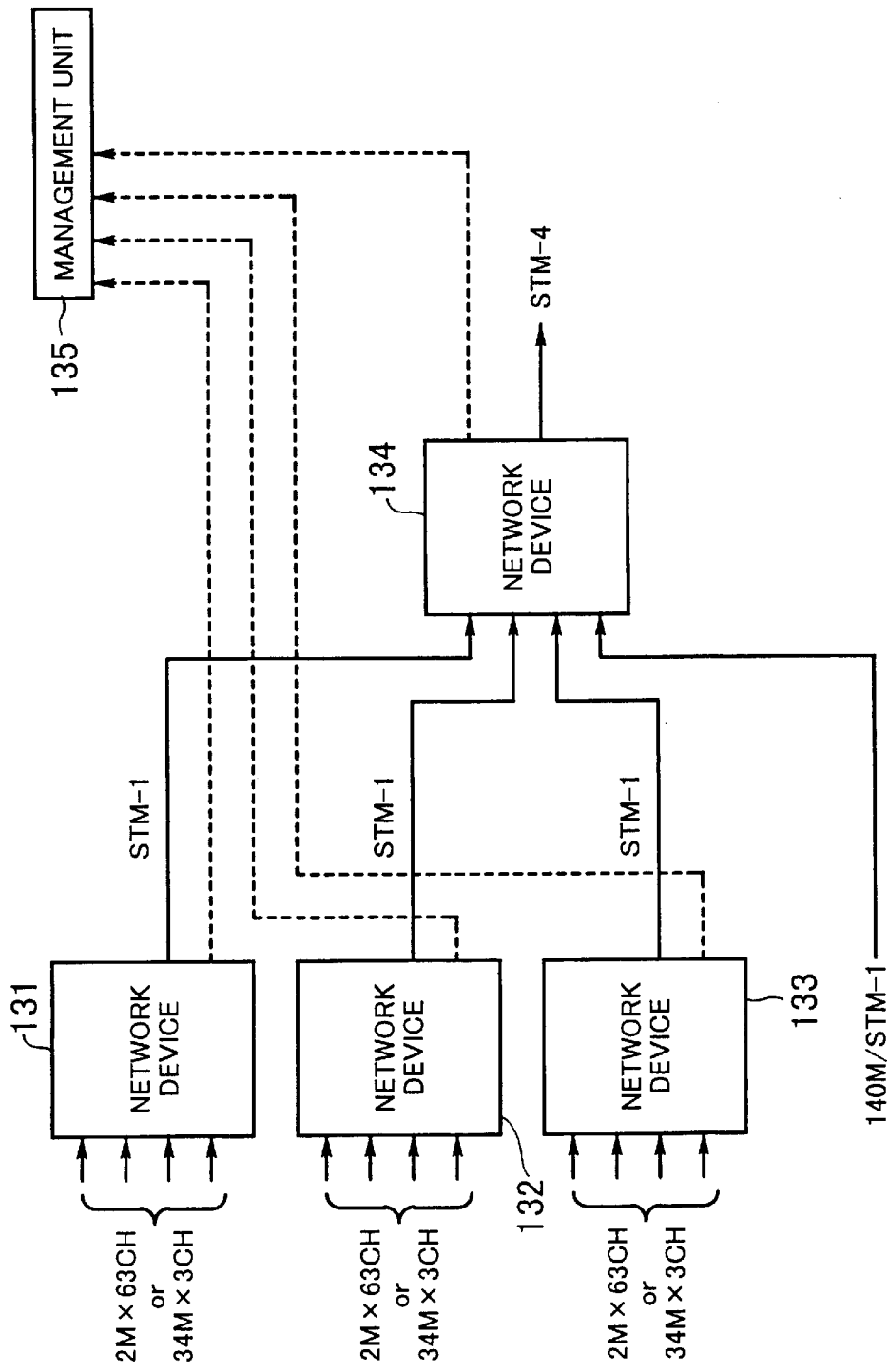
FIG. 33 is a diagram which shows a system organized by three network devices to convert 2.048 Mb/s or 34.368 Mb/s PDH signals into a single STM-1 bitstream and a network device to convert four STM-1 bitstreams into a single STM-4 bitstream.

FIG. 29 is a diagram which shows a transmission apparatus of the tenth embodiment, in which two high-order group units 11 and 13 are installed in the slots SL4 and SL6 (FIG. 2). Both are STM-1 units (FIG. 11), serving as active units. On the other hand, three 2M units (FIG. 5) are installed in the slots SL10 to SL12, functioning as low-order group units 21 to 23, respectively. Note that all these units 21 to 23 serve as active units ("W").

From the high-order group unit 11 on the east side, the cross-connect unit 30 receives a single AU-4 signal through its high-order group port 30a (see FIG. 3 for the port arrangement and individual port numbers). Likewise, it receives another single AU-4 signal from the high-order group unit 13 on the west side. With an appropriate setup, the cross-connect unit 30 distributes the reception signal from the east side port #1-1 to three low-order group ports #5 to #7. The cross-connect unit 30 also distributes the other signal received from the west side port #3-1 to the same three ports #5 and #6.

The cross-connect unit 30 supplies those east-side and west-side output signals to the low-order group units 21 to 23. At the front-end portion of these low-order group units, the path switches PSW choose either the east-side or the west-side signal in accordance with selection commands produced from alarm information, etc. The low-order group units 21 to 23 then convert the AU-4 signals to 2.048 Mb/s PDH signals.

After the conversion is finished, the output selector SEL1 in the low-order group unit 21 sends its output signal to a selector SEL2 disposed at the front end of the interface unit 41 (EIU1). Likewise, the output selector SEL1 in the next low-order group unit 22 supplies its output signal to another selector SEL3 of the same interface unit 41 (EIU1), while that in the low-order group unit 23 sends its output signal to a selector SEL4 of the next interface unit 42 (EIU2). As such, the tenth embodiment employs only two interface units 41 and 42 (EIU1 and EIU2) out of four possible units 41 to 44 (EIU1 to EIU4). Since no redundancy configuration is implemented in the low-order group units in the tenth embodiment, the selectors SEL2 to SEL4 will simply output the signals that they receive.

As an alternative configuration concerning the tenth embodiment of FIG. 29, it is possible to install high-order group units 12 and 14 into the slots SL5 and SL7, instead of inserting high-order group units 11 and 13 into the slots SL4 and SL6.

Note here that it is not intended to limit the cross-connections between high-order group units and low-order group units to what shown in the first to tenth 25 embodiments described above. Recall the first embodiment of FIG. 18, for instance. Although the illustrated cross-connections allow incoming transmission signals from the high-order group port #1-1 to be transported to the low-order group ports #11 and #12, it may be possible to send the same signals to other low-order group ports #7 and #8, alternatively. Similar to this, the cross-connect unit 30 may be configured to transport the signals from the high-order group port #1-2 to the low-order group ports #11 and #12; from the port #1-3 to the ports #5 and #6; and from the port #1-4 to the ports #9 and #10.

The above discussion is summarized as follows. According to the present invention, high-level group transmission units and low-order group transmission units handle different signal types with respect to the multiplexing hierarchy of SDH, but they are designed to interface with the cross-connect unit at a common predetermined level of the hierarchy. Since the digital bitstreams received from the high-order and low-order group ports have a unified frame format, the cross-connect unit can concentrate on the tasks of path consolidation, segregation, and grooming, without converting the signal formats.

This structural arrangement brings an advantage that a desired transmission apparatus can be built by selecting appropriate low-order or high-order group transmission units designed for the required hierarchical levels and simply installing them into their dedicated module slots on the mounting rack 1. In other words, the SDH transmission apparatus of the present invention has a simplified internal configuration, as well as employing a versatile cross-connect unit that can deal with various classes of digital bitstreams regardless of their levels in the SDH multiplexing hierarchy.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An SDH transmission apparatus which multiplexes transmission signals according to a multiplexing hierarchy, comprising:
   a mounting rack having a plurality of module slots and a backplane providing electrical interconnection among functional modules installed in the plurality of module slots;
   a cross-connect unit, installed in dedicated cross-connect unit slots on said mounting rack, which comprises high-order group ports and low-order group ports;
   at least one high-order group transmission unit, installed in dedicated high-order group slots on said mounting rack to handle high-order digital bitstreams to communicate with equipment outside the SDH transmission apparatus, which sends and receives multiplexed signals at a predetermined level of the multiplexing hierarchy to/from the high-order group ports of said cross-connect unit; and
   a plurality of low-order group transmission units, installed in dedicated low-order group slots on said mounting rack to handle low-order digital bitstreams to communicate with equipment outside the SDH transmission apparatus, which sends and receives the multiplexed signals at the predetermined level of the multiplexing hierarchy to/from the low-order group ports of said cross-connect unit
   wherein the predetermined level of the multiplexing hierarchy is fixed regardless of the bitrates of the high-order digital bitstreams or low-order digital bitstreams.

2. The SDH transmission apparatus according to claim 1, wherein the multiplexed signals at the predetermined level of the multiplexing hierarchy have an AU-4 signal format.

3. The SDH transmission apparatus according to claim 1, wherein said plurality of low-order group transmission units each comprise:
   a path switch which selects one of two single-sourced transmission signals received from two transmission lines of a dual ring network which are running in opposite directions; and
   an output selector which selects a destination of an output signal of said each low-order group transmission unit, depending on whether a redundancy configuration is implemented therein.

4. The SDH transmission apparatus according to claim 1, further comprising a plurality of interface units, installed in said mounting rack, which serve as an interface between said plurality of low-order group transmission units and external equipment,
   wherein said plurality of low-order group transmission units are configured to have a redundancy capability, and
   each of said plurality of interface units comprises an input selector which selects one of two single-sourced signals supplied as a result of the redundancy capability implemented in said plurality of low-order group transmission units.

5. The SDH transmission apparatus according to claim 1, wherein the backplane of said mounting rack has fixed circuit connections regardless of what types of and how many functional modules are installed in said mounting rack.

6. The SDH transmission apparatus according to claim 1, wherein
   said at least one high-order group transmission unit includes two transmission units that perform a signal format conversion between STM-4 and AU-4,
   said plurality of low-order group transmission units include at most eight transmission units that perform a signal format conversion between AU-4 signals and either one of STM-1, C-4, and C-3 signals, and are configured to have a redundancy capability, and
   said SDH transmission apparatus serves as an element of a point-to-point network.

7. The SDH transmission apparatus according to claim 1, wherein
   said at least one high-order group transmission unit includes two transmission units that perform a format conversion between STM-4 signals and AU-4 signals,
   said plurality of low-order group transmission units include at most eight transmission units that perform a signal format conversion between AU-4 signals and either one of STM-1, C-4, and C-3 signals, and are configured to have a redundancy capability, and
   said SDH transmission apparatus serves as an element of a ring network.

8. The SDH transmission apparatus according to claim 1, wherein
   said at least one high-order group transmission unit includes two transmission units that perform a format conversion between STM-4 signals and AU-4 signals,
   said plurality of low-order group transmission units include at most four transmission units that perform a format conversion between AU-4 signals and either one of STM-1, C-4, and C-3 signals, and are configured to have no redundancy capabilities, and
   said SDH transmission apparatus serves as an element of a point-to-point network.

9. The SDH transmission apparatus according to claim 1, wherein
   at least one high-order group transmission unit includes four transmission units that perform a format conversion between STM-4 signals and AU-4 signals, and
   said plurality of low-order group transmission units include at most eight transmission units that perform a format conversion between AU-4 signals and either one of STM-1, C-4, and C-3 signals, and are configured to have no redundancy capabilities, and
   said SDH transmission apparatus serves as an element of a linear network.

10. The SDH transmission apparatus according to claim 1 wherein said at least one high-order group transmission unit includes two transmission units that perform a format conversion between STM-4 signals and AU-4 signals, said plurality of low-order group transmission units include at most four transmission units that perform a format conversion between AU-4 signals and either one of STM-1, C-4, and C-3 signals, and are configured to have no redundancy capabilities, and said SDH transmission apparatus serves as an element of a ring network.

11. The SDH transmission apparatus according to claim 1, wherein said at least one high-order group transmission unit includes two transmission units that perform a format conversion between STM-1 signals and AU-4 signals, said plurality of low-order group transmission units include at most six transmission units that perform a format conversion between AU-4 signals and C-12 signals, and are configured to have a redundancy capability, and said SDH transmission apparatus serves as an element of a point-to-point network.

12. The SDH transmission apparatus according to claim 1, wherein said at least one high-order group transmission unit includes two transmission units that perform a format conversion between STM-1 signals and AU-4 signals, said plurality of low-order group transmission units include at most six transmission units that perform a format conversion between AU-4 signals and C-12 signals, and are configured to have a redundancy capability, and said SDH transmission apparatus serves as an element of a ring network.

13. The SDH transmission apparatus according to claim 1, wherein said at least one high-order group transmission unit includes two transmission units that perform a format conversion between STM-1 signals and AU-4 signals, said plurality of low-order group transmission units include at most three transmission units that perform a format conversion between C-12 signals and AU-4 signals, and are configured to have no redundancy capabilities, and said SDH transmission apparatus serves as an element of a point-to-point network.

14. The SDH transmission apparatus according to claim 1, wherein said at least one high-order group transmission unit includes four transmission units that perform a format conversion between STM-1 signals and AU-4 signals, said plurality of low-order group transmission units include at most six transmission units that perform a format conversion between C-12 signals and AU-4 signals, and are configured to have no redundancy capabilities, and said SDH transmission apparatus serves as an element of a linear network.

15. The SDH transmission apparatus according to claim 1, wherein said at least one high-order group transmission unit includes two transmission units that perform a format conversion between STM-1 signals and AU-4 signals, said plurality of low-order group transmission units include at most three transmission units that perform a format conversion between C-12 signals and AU-4 signals, and are configured to have no redundancy capabilities, and said SDH transmission apparatus serves as an element of a ring network.

* * * * *